United States Patent
Akachi et al.

(10) Patent No.: US 11,900,698 B2
(45) Date of Patent: Feb. 13, 2024

(54) INFORMATION PROCESSING DEVICE AND INFORMATION PROCESSING METHOD

(71) Applicant: Clarion Co., Ltd., Saitama (JP)

(72) Inventors: Masashi Akachi, Saitama (JP);
Masashi Koga, Saitama (JP);
Hiroshige Furugori, Saitama (JP);
Hiroki Abe, Saitama (JP)

(73) Assignee: CLARION CO., LTD., Saitama (JP)

( * ) Notice: Subject to any disclaimer, the term of this patent is extended or adjusted under 35 U.S.C. 154(b) by 726 days.

(21) Appl. No.: 17/049,461

(22) PCT Filed: Jan. 28, 2019

(86) PCT No.: PCT/JP2019/002684
§ 371 (c)(1),
(2) Date: Oct. 21, 2020

(87) PCT Pub. No.: WO2019/207872
PCT Pub. Date: Oct. 31, 2019

(65) Prior Publication Data
US 2021/0253025 A1 Aug. 19, 2021

(30) Foreign Application Priority Data
Apr. 23, 2018 (JP) ................. 2018-081998

(51) Int. Cl.
*G06V 20/59* (2022.01)
*B60Q 9/00* (2006.01)
(Continued)

(52) U.S. Cl.
CPC ............. *G06V 20/597* (2022.01); *B60Q 9/00* (2013.01); *G06V 20/58* (2022.01); *G08G 1/161* (2013.01);
(Continued)

(58) Field of Classification Search
CPC ........ G06V 20/597; G06V 20/58; B60Q 9/00; G08G 1/161; B60K 35/00;
(Continued)

(56) References Cited

U.S. PATENT DOCUMENTS 10,023,204 B1 * 7/2018 Kim ..................... B60W 30/095
10,710,502 B2 * 7/2020 Ohta ....................... B60Q 9/008
(Continued)

FOREIGN PATENT DOCUMENTS

CN 103843047 A * 6/2014 ............. B60K 28/02
CN 106458126 2/2017
(Continued)

OTHER PUBLICATIONS

Translation of CN-103843047-A, 8 pages (Year: 2014).*
(Continued)

*Primary Examiner* — Dale W Hilgendorf
(74) *Attorney, Agent, or Firm* — Wenderoth, Lind & Ponack, L.L.P.

(57) ABSTRACT

An information processing device and an information processing method that prevent unnecessary warning are provided. An information processing device includes a host vehicle information acquisition part configured to acquire host vehicle information on a host vehicle, a setting part configured to set an allowable range for a driver's sight of the host vehicle based on the host vehicle information, a driver information acquisition part configured to acquire driver information on the driver, a determination part (inattentive driving determination part) configured to determine whether or not the driver is looking at the allowable range based on the allowable range and the driver information, and an output part (sound output part, vibration part, display
(Continued)

part) configured to output a predetermined notification based on the determination of the determination part (inattentive driving determination part).

14 Claims, 20 Drawing Sheets

(51) Int. Cl.
  *G08G 1/16* (2006.01)
  *G06V 20/58* (2022.01)
  *B60K 35/00* (2006.01)
(52) U.S. Cl.
  CPC ........ *B60K 35/00* (2013.01); *B60K 2370/149* (2019.05); *B60K 2370/152* (2019.05); *B60K 2370/157* (2019.05); *B60K 2370/158* (2019.05)
(58) Field of Classification Search
  CPC ........ B60K 2370/149; B60K 2370/152; B60K 2370/157; B60K 2370/158
  See application file for complete search history.

(56) References Cited

U.S. PATENT DOCUMENTS

| | | | |
|---|---|---|---|
| 11,423,674 B2* | 8/2022 | Lee | G06T 7/50 |
| 11,827,148 B2* | 11/2023 | Oigawa | G06T 11/00 |
| 2014/0032053 A1* | 1/2014 | Mochizuki | G08G 1/163 |
| | | | 701/45 |
| 2014/0249717 A1* | 9/2014 | Takahashi | G06V 20/597 |
| | | | 701/36 |
| 2015/0154461 A1* | 6/2015 | Kitaura | G06V 20/597 |
| | | | 348/148 |
| 2015/0269445 A1 | 9/2015 | Ueda et al. | |
| 2017/0076608 A1 | 3/2017 | Suzuki et al. | |
| 2017/0225617 A1* | 8/2017 | Morimura | G06V 40/10 |
| 2018/0170257 A1* | 6/2018 | Ohta | B60Q 9/008 |
| 2021/0081690 A1* | 3/2021 | Inagaki | G06V 20/597 |
| 2022/0314886 A1* | 10/2022 | Oigawa | B60K 35/00 |

FOREIGN PATENT DOCUMENTS

| | | | | |
|---|---|---|---|---|
| DE | 102018216014 A1 * | 5/2019 | | B60K 35/00 |
| JP | 8-83344 | 3/1996 | | |
| JP | 2000-172966 | 6/2000 | | |
| JP | 2000-351337 | 12/2000 | | |
| JP | 2001-294080 | 10/2001 | | |
| JP | 2002-154375 | 5/2002 | | |
| JP | 2002-205615 | 7/2002 | | |
| JP | 2006-236029 | 9/2006 | | |
| JP | 2007-226666 | 9/2007 | | |
| JP | 2015011355 A * | 1/2015 | | G06K 9/00845 |
| JP | 2015-179368 | 10/2015 | | |
| JP | 2015-231818 | 12/2015 | | |

OTHER PUBLICATIONS

Translation of JP-2015011355-A, 15 pages (Year: 2015).*
Translation of DE-102018216014-A1, 24 pages (Year: 2019).*
Extended European Search Report dated Dec. 7, 2021 issued in corresponding European Patent Application No. 19791627.3.
International Search Report dated Apr. 2, 2019 in International (PCT) Application No. PCT/JP2019/002684.
Decision of Refusal dated Jul. 12, 2022 in Japanese Patent Application No. 2018-081998, with English-language translation.

* cited by examiner

INFORMATION PROCESSING DEVICE AND INFORMATION PROCESSING METHOD

CROSS-REFERENCE TO RELATED APPLICATION

The present application is based on and claims priority to Japanese Patent Application No. 2018-081998, filed on Apr. 23, 2018, the disclosure of which is hereby incorporated by reference in its entirety.

TECHNICAL FIELD

This disclosure relates to an information processing device and an information processing method.

BACKGROUND ART

An information processing device configured to warn a driver of a vehicle of inattentive driving, for example, has been known (see JP 2007-226666 A, for example).

JP 2007-226666 A discloses a navigation system including a navigation unit. The navigation unit includes a configuration having a CPU which sets a warning level based on at least one of a geographical situation around a host vehicle, a neighboring vehicle situation, and a driving situation of a host vehicle. The navigation unit also includes a configuration which warns inattentive driving based on a set warning level when inattentive driving of a driver is detected by an image processor which determines the inattentive driving of the driver.

SUMMARY

However, the system disclosed in JP 2007-226666 A may determine the driver as driving inattentively when the driver is looking at a predetermined direction for safety confirmation in a location where safety confirmation is required, such as an intersection. Such determination may lead unnecessary warning to the driver.

In order to solve the above problem, an information processing device of the present disclosure includes a host vehicle information acquisition part configured to acquire host vehicle information on a host vehicle, a setting part configured to set an allowable range for a driver's sight of the host vehicle based on the host vehicle information, a driver information acquisition part configured to acquire driver information on the driver, a determination part configured to determine whether or not the driver is looking at the allowable range based on the allowable range and the driver information, and an output part configured to output a predetermined notification based on the determination of the determination part.

In order to solve the above problem, an information processing method of the present disclosure includes a host vehicle information acquisition step of acquiring host vehicle information on a host vehicle, a setting step of setting an allowable range for a driver's sight of the host vehicle based on the host vehicle information, a driver information acquisition step of acquiring driver information on the driver, a determination step of determining whether or not the driver is looking at the allowable range based on the allowable range and the driver information, and an outputting step of outputting a predetermined notification based on the determination of the determination step.

DESCRIPTION OF EMBODIMENTS

Figure 1:
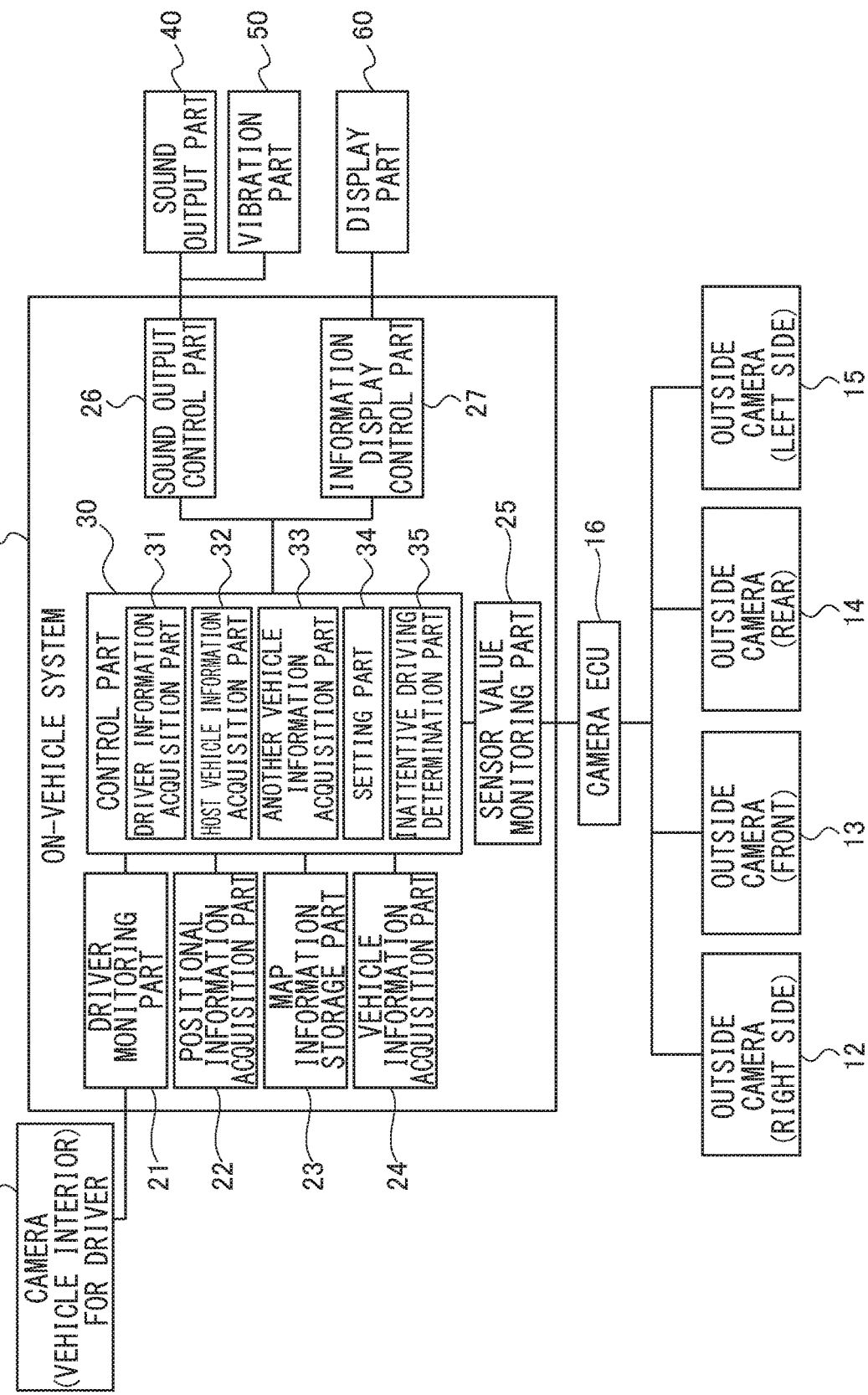
FIG. 1 is a block diagram illustrating a system configuration of an on-vehicle information processing device of a first embodiment.

Hereinafter, embodiments of an information processing device and an information processing method according to the present disclosure will be described based on first and second embodiments illustrated in the drawings.

First Embodiment

An on-vehicle information processing device and an on-vehicle information processing method in the first embodiment are used in an on-vehicle information processing device 10 installed in a host vehicle 1.

Figure 2:
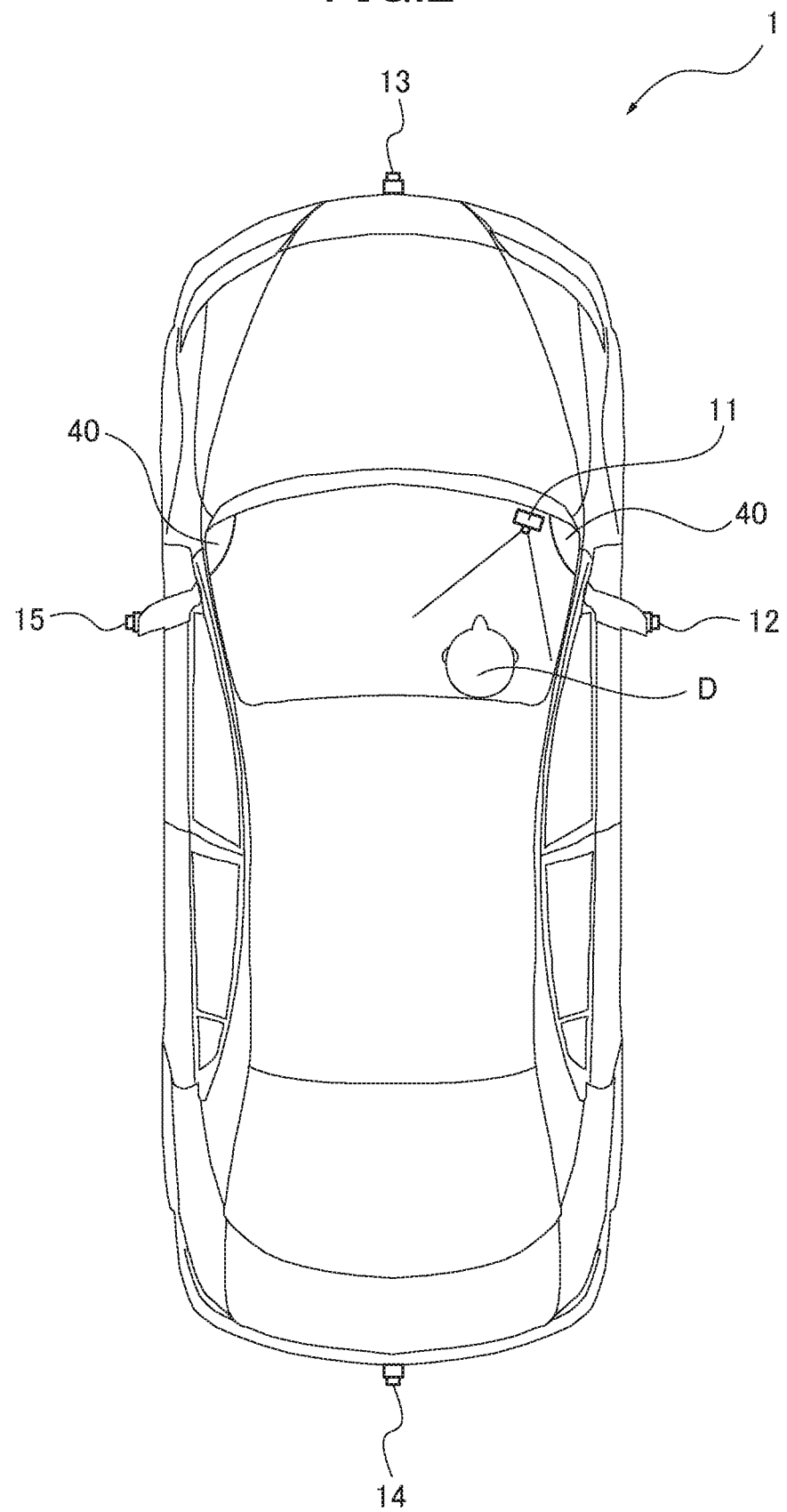
FIG. 2 is a schematic drawing illustrating a configuration of a camera for a driver, outside cameras, and a sound output part of the on-vehicle information processing device according to the first embodiment.
Figure 3:
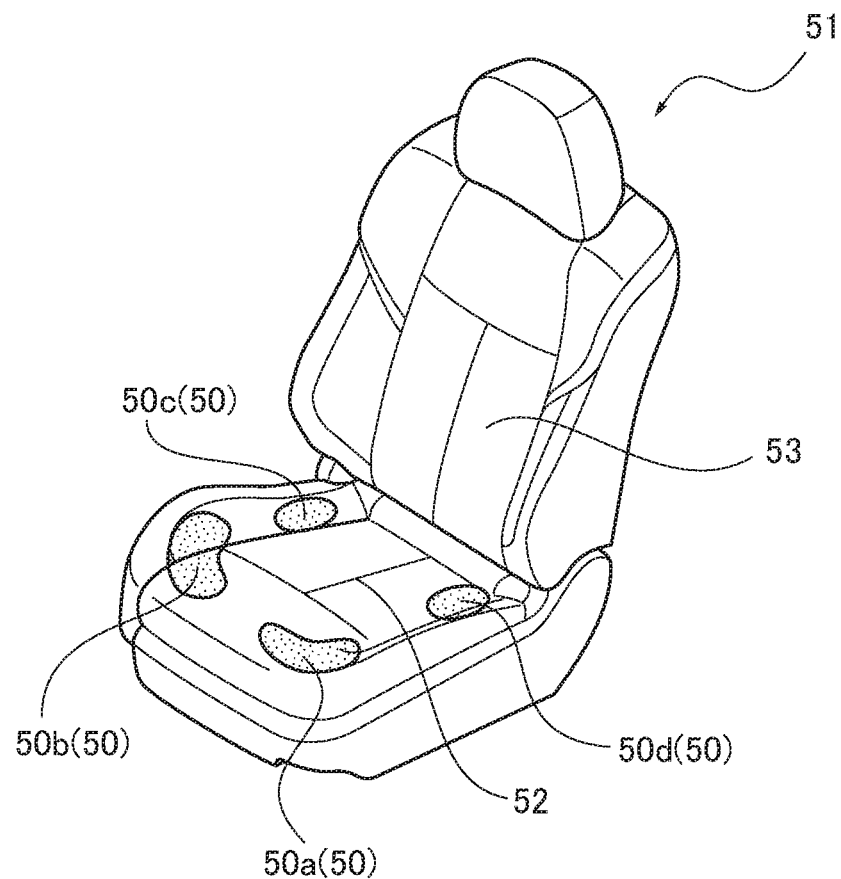
FIG. 3 is a schematic drawing illustrating a configuration of vibration parts of the on-vehicle information processing device according to the first embodiment.
Figure 4:
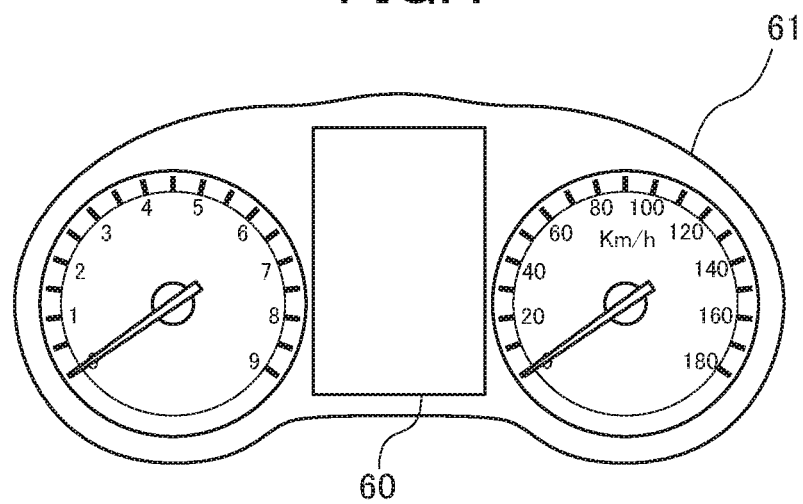
FIG. 4 is a schematic drawing illustrating a configuration of a display part of the on-vehicle information processing device according to the first embodiment.
Figure 5:
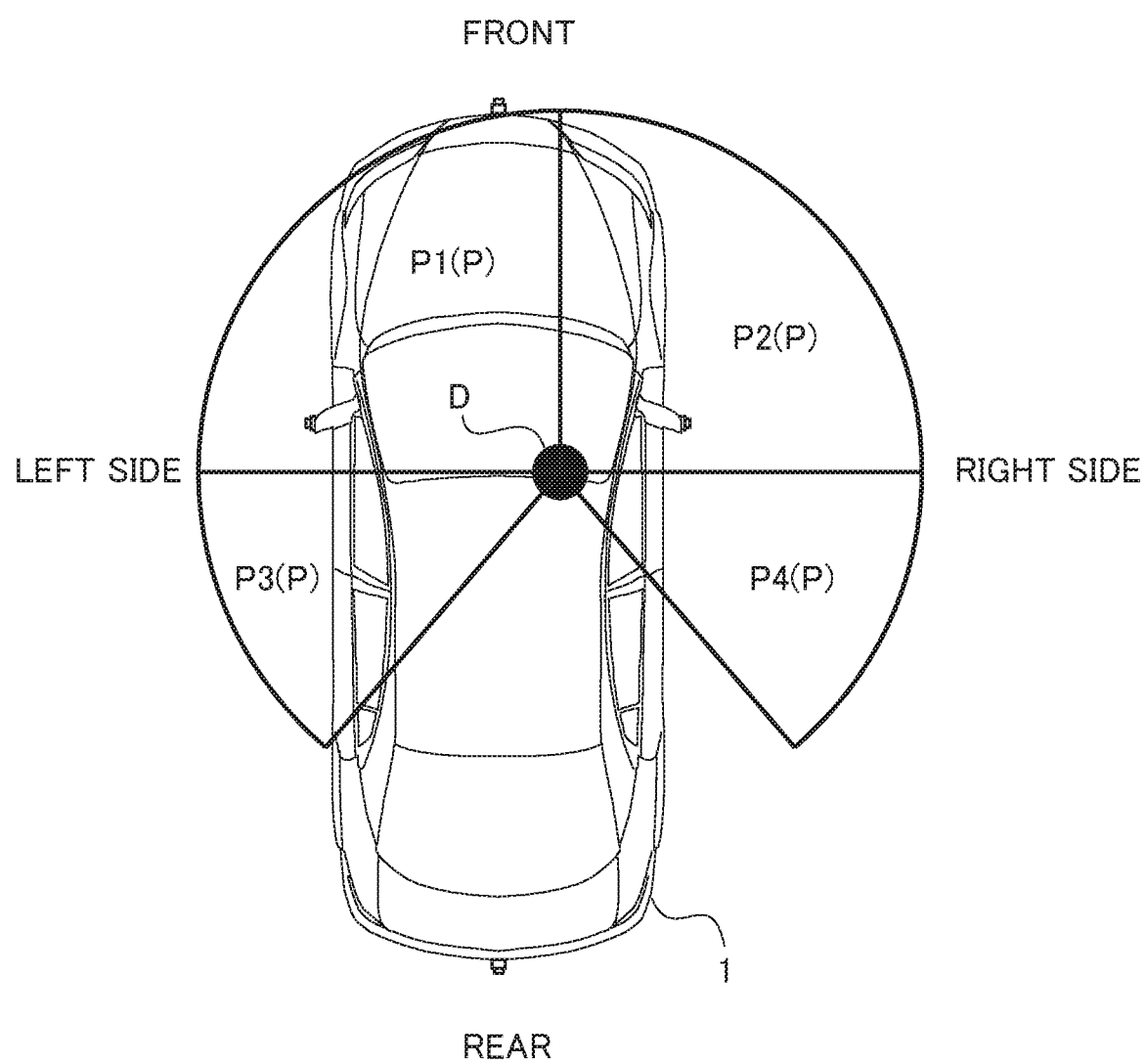
FIG. 5 is a drawing describing allowable ranges set by a setting part of the on-vehicle information processing device according to the first embodiment.

(Configuration of On-Vehicle Information Processing Device) FIG. 1 is a block diagram illustrating a system configuration of the on-vehicle information processing device of the first embodiment. FIG. 2 is a schematic drawing illustrating a configuration of a camera for a driver, outside cameras, and a sound output part of the on-vehicle information processing device of the first embodiment. FIG. 3 is a schematic drawing illustrating a configuration of vibration parts of the on-vehicle information processing device of the first embodiment. FIG. 4 is a schematic drawing illustrating the configuration of a display part of the on-vehicle information processing device of the first embodiment. FIG. 5 is a drawing describing allowable ranges set by a setting part of the on-vehicle information processing device of the first embodiment. Hereinafter, the configuration of the on-vehicle information processing device of the first embodiment will be described with reference to FIGS. 1 to 5.

The on-vehicle information processing device 10 includes a camera 11 for a driver, outside cameras 12 to 15, a camera Electronic Control Unit (ECU) 16, an on-vehicle system 20, a sound output part 40 as an output part, a vibration part 50 as an output part, and a display part 60 as an output part.

As illustrated in FIG. 2, the camera 11 for a driver is disposed in a vehicle interior of a host vehicle 1. The camera 11 for a driver faces a face and eyes of a driver D to photograph the face and the eyes of the driver D.

The outside cameras 12 to 15 include the outside camera 12 attached to a right portion of the host vehicle 1 to photograph a right of the host vehicle 1, the outside camera 13 attached to a front portion of the host vehicle 1 to photograph a front of the host vehicle 1, the outside camera 14 attached to a rear portion of the host vehicle 1 to photograph a rear of the host vehicle 1, and the outside camera 15 attached to a left portion of the host vehicle 1 to photograph a left of the host vehicle 1. The region around the host vehicle 1 can be completely monitored by the four outside cameras 12 to 15.

As illustrated in FIG. 1, the camera ECU 16 is connected to the outside cameras 12 to 15 to electronically control the outside cameras 12 to 15.

The on-vehicle system 20 includes a driver monitoring part 21, a positional information acquisition part 22, a map information storage part 23, a vehicle information acquisition part 24, a sensor value monitoring part 25, a sound output control part 26, an information display control part 27, and a control part 30.

The driver monitoring part 21 is connected to the camera 11 for a driver to monitor a direction of the driver D's face and a direction of the driver D's eyes from the image photographed by the camera 11 for a driver. The direction of the driver D's face and the direction of the driver D's eyes are represented as a direction of a driver D's sight.

The positional information acquisition part 22 receives signals from a GPS satellite to acquire the positional information on the host vehicle 1 based on the received signals.

The map information storage part 23 stores map information. The map information includes information on the number of lanes of a road, information on an intersection and a merging point, and information on a destination and a traveling route provided from a navigation system that navigates a traveling route to a destination.

The vehicle information acquisition part 24 acquires vehicle information such as information on a steering angle of a steering wheel, information on transition of a speed, and information on a blinker. The information on a blinker includes information whether a right blinker or a left blinker is turned on or turned off.

The sensor value monitoring part 25 is connected to the camera ECU 16 to monitor another vehicle approaching the host vehicle 1 based on the image data photographed by the outside cameras 12 to 15 and sonar data acquired by a sonar. Both or one of the image data and the sonar data may be used when monitoring another vehicle approaching the host vehicle 1. The sensor value monitoring part 25 is connected to the control part 30 to send another vehicle information as monitoring information to the control part 30.

The sound output control part 26 is connected to the control part 30 to control the sound output part 40 and the vibration part 50 based on processing information from the control part 30. As illustrated in FIG. 2, the sound output part 40 may be a speaker disposed in the vehicle interior of the host vehicle 1. The sound output part 40 notifies the driver D of information through hearing. The sound output part 40 outputs information, for example, "please keep your eyes on the road" and "please look ahead, and close to the front vehicle".

As illustrated in FIG. 3, the vibration part 50 is disposed in a seat surface 52 of a driver's seat 51 of the host vehicle 1. The vibration part 50 notifies the driver D of information through stimulus with vibration (tactile sensation). The vibration part 50 includes a left front vibration part 50a disposed in a left front portion of the seat surface 52, a right front vibration part 50b disposed in a right front portion of the seat surface 52, a right rear vibration part 50c disposed in a right rear portion of the seat surface 52, and a left rear vibration part 50d disposed in a left rear portion of the seat surface 52.

The left front vibration part 50a vibrates to notify the driver D of the information on the left front side of the host vehicle 1. The right front vibration part 50b vibrates to notify the driver D of the information on the right front side of the host vehicle 1. The right rear vibration part 50c vibrates to notify the driver D of the information on the right rear side of the host vehicle 1. The left rear vibration part 50d vibrates to notify the driver D of the information on the left rear portion of the host vehicle 1.

The driver D thereby recognizes which direction the information relates to through the tactile sensation. The vibration part 50 may be disposed in a back surface 53 of the driver's seat 51. The vibration part 50 may be disposed in a passenger seat or a back seat.

The information display control part 27 is connected to the control part 30 to control information to be displayed on the display part 60 based on the processing information from the control part 30. As illustrated in FIG. 4, the display part 60 may be a liquid crystal panel attached to a meter device 61 of the host vehicle 1. The display part 60 notifies the driver D of information through vision. The display part 60 displays the information, for example, "please keep your eyes on the road" and "please look ahead, and close to the front vehicle".

The display part 60 is not limited as long as it can notify information visually. For example, the display part 60 may be, for example, a liquid crystal display, a display integrated with a touch panel, and a head-up display. The display part 60 gives not only the driver D but also a passenger the information.

As illustrated in FIG. 1, the control part 30 includes a driver information acquisition part 31, a host vehicle information acquisition part 32, an another vehicle information acquisition part 33, a setting part 34, and an inattentive driving determination part 35. The control part 30 controls the entire on-vehicle information processing device 10.

The driver information acquisition part 31 acquires monitoring information monitored by the driver monitoring part 21. Namely, the driver information acquisition part 31 acquires driver information on the driver D.

The host vehicle information acquisition part 32 acquires the positional information acquired by the positional information acquisition part 22, the storage information stored in the map information storage part 23, and the vehicle information acquired by the vehicle information acquisition part 24. Namely, the host vehicle information acquisition part 32 acquires the host vehicle information on the host vehicle 1.

The another vehicle information acquisition part 33 acquires another vehicle information on another vehicle from the monitoring information monitored by the sensor value monitoring part 25.

The setting part 34 sets an allowable range P for the driver D's sight. The allowable range P for the driver D's sight set by the setting part 34 is a certain range for the driver D to look at for safety confirmation.

As illustrated in FIG. 5, the allowable range P for the driver D's sight includes a first range P1, a second range P2, a third range P3, and a fourth range P4. The first range P1 is a left front range from a position where the driver D turns his or her face or eyes to the front to a position where the driver D turns his or her face or eyes to the left at 90°. The second range P2 is a right front range from a position where the driver D turns his or her face or eyes to the front to a position where the driver D turns his or her face or eyes to the right at 90°. The third range P3 is a left rear range from a position where the driver D turns his or her face or eyes to the left to a position where the driver D turns his or her face or eyes to the left at 45°. The fourth range P4 is a right rear range from a position where the driver D turns his or her face or eyes to the right to a position where the driver D turns his or her face or eyes to the right at 45°. Namely, the allowable range P for the driver D's sight is set as a plane having a certain range, not as a line.

The setting part 34 sets the allowable range P for the driver D's sight depending on a situation. For example, when the host vehicle 1 turns left at an intersection with a traffic light, the setting part 34 sets the direction of the driver D's sight as the first range P1. When the host vehicle 1 turns right at the intersection with the traffic light, the setting part 34 sets the direction of the driver D's sight as the second range P2. When the host vehicle 1 turns left at the intersection without the traffic light, the setting part 34 sets the direction of the driver D's sight as the first range P1 and the second range P2. When the host vehicle 1 turns right at the intersection without the traffic light, the setting part 34 sets the direction of the driver D's sight as the first range P1 and the second range P2.

When the host vehicle 1 merges into a main lane on the left side of the host vehicle 1, the setting part 34 sets the direction of the driver D's sight as the first range P1 and the third range P3. In this situation, the driver D is required to confirm the safety on the left rear side. When the host vehicle 1 merges into the main lane on the right side of the host vehicle 1, the setting part 34 sets the direction of the driver D's sight as the second range P2 and the fourth range P4. In this situation, the driver D is also required to confirm the safety on the right rear side.

A method of setting the allowable range P for the driver D's sight includes a method of using information on a blinker, a method of using the positional information on the host vehicle, and a method of using another vehicle information. Any method may be used.

The inattentive driving determination part 35 determines whether or not the driver D of the host vehicle 1 is looking at the allowable range P set by the setting part 34 based on the allowable range P set by the setting part 34 and the driver information acquired by the driver information acquisition part 31.

The control part 30 is connected to the driver monitoring part 21, the positional information acquisition part 22, the map information storage part 23, the vehicle information acquisition part 24, the sensor value monitoring part 25, the sound output control part 26, and the information display control part 27.

The monitoring information of the driver monitoring part 21, the positional information of the positional information acquisition part 22, the map information of the map information storage part 23, the vehicle information of the vehicle information acquisition part 24, and the monitoring information of the sensor value monitoring part 25 are input to the control part 30. The control part 30 executes an after-described inattentive driving determination process based on the monitoring information of the driver monitoring part 21, the map information of the map information storage part 23, the vehicle information of the vehicle information acquisition part 24, and the monitoring information of the sensor value monitoring part 25. The control part 30 outputs the result of the inattentive driving determination process to the sound output control part 26 and the information display control part 27.

Figure 6:
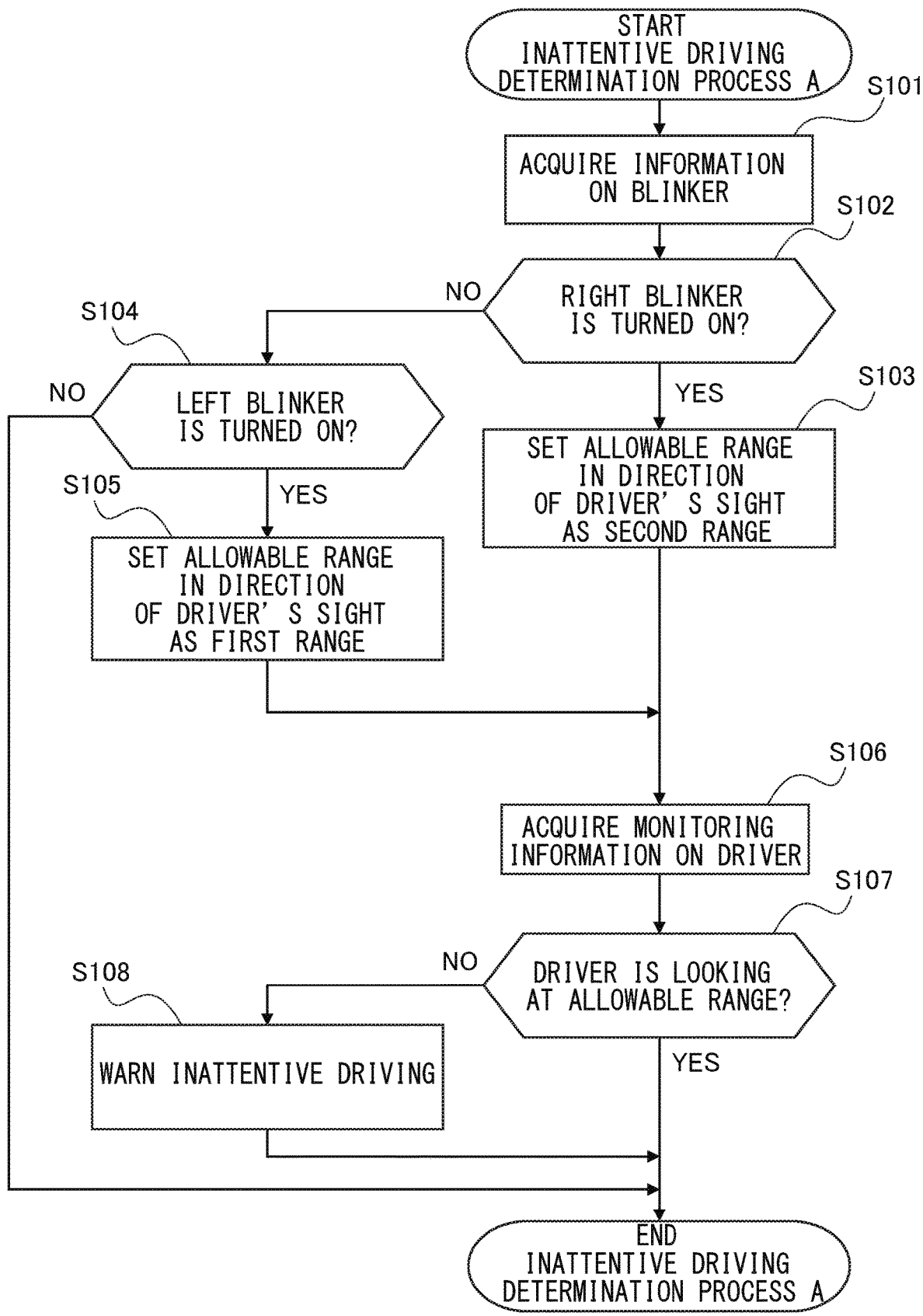
FIG. 6 is a flowchart describing an inattentive driving determination process A of the first embodiment.
Figure 7:
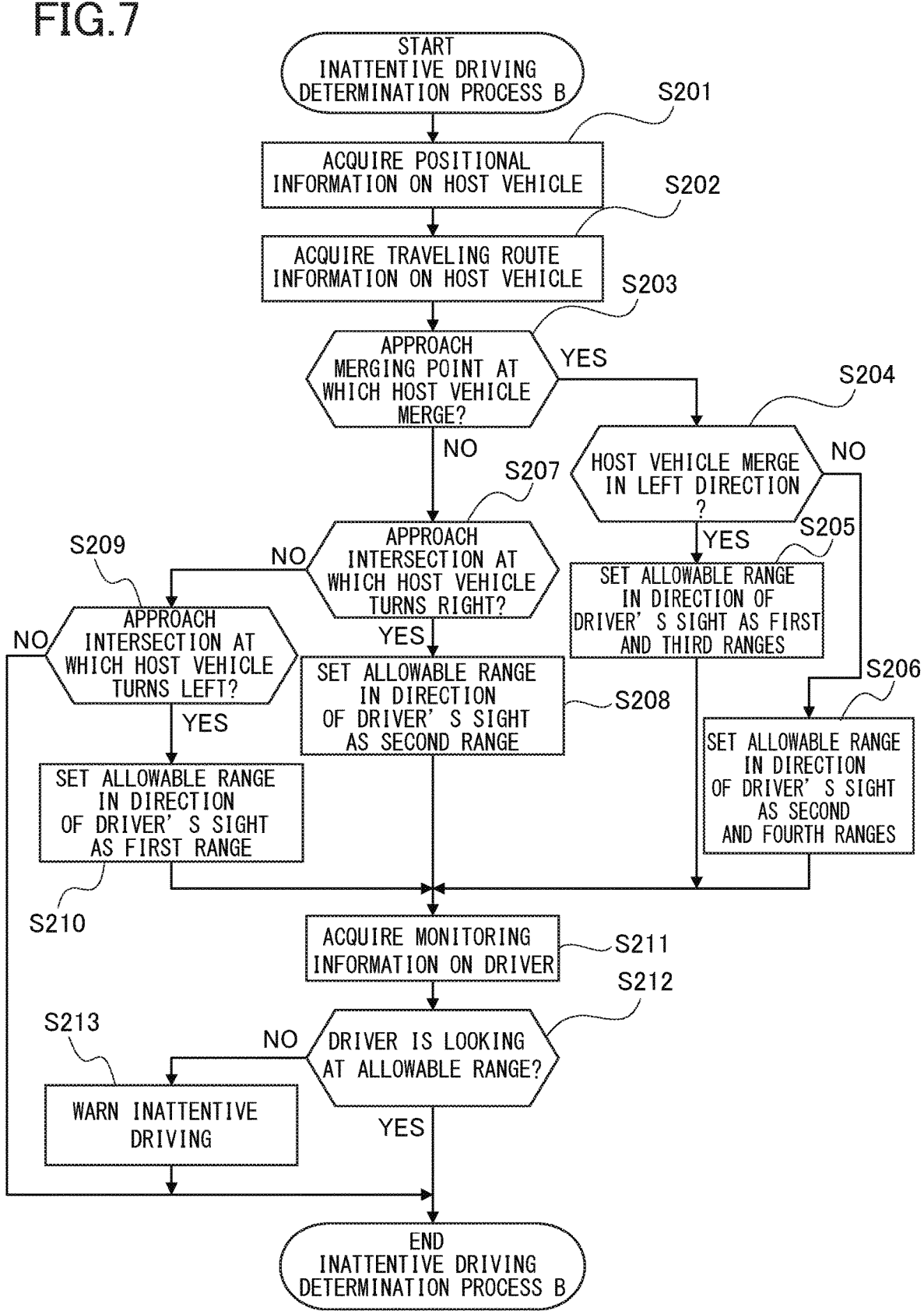
FIG. 7 is a flowchart describing an inattentive driving determination process B of the first embodiment.
Figure 8:
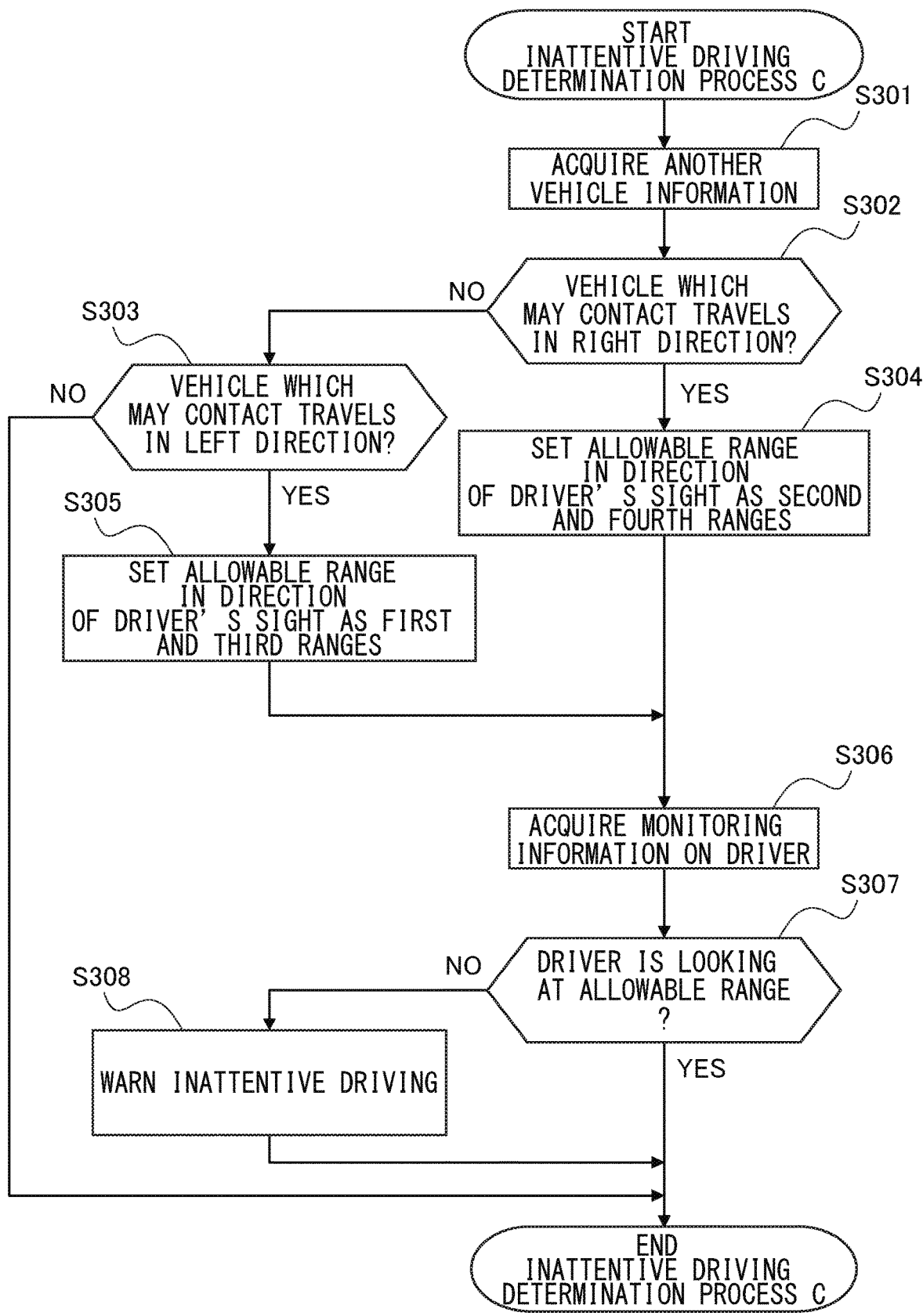
FIG. 8 is a flowchart describing an inattentive driving determination process C of the first embodiment.
Figure 9:
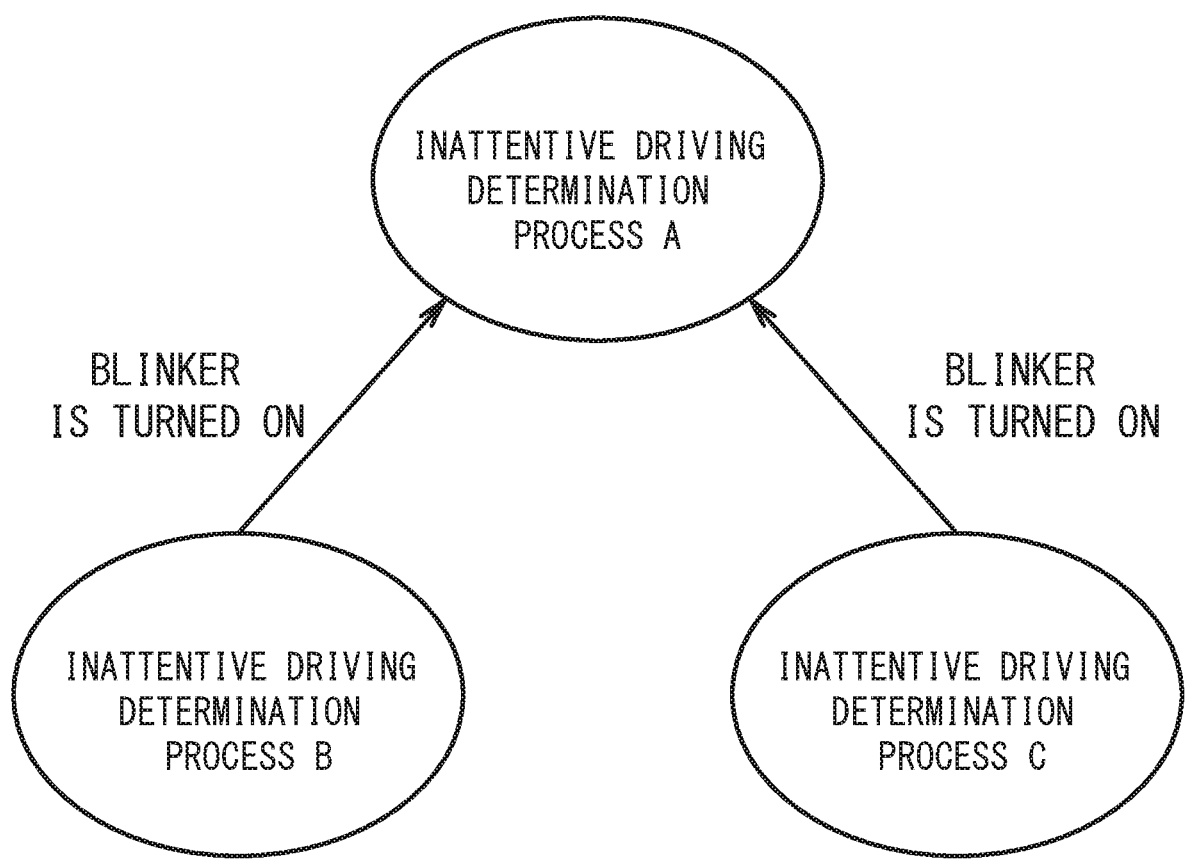
FIG. 9 is a drawing describing transition of the inattentive driving determination process of the first embodiment.

(Inattentive Driving Determination Process) FIG. 6 is a flowchart describing an inattentive driving determination process A of the first embodiment. FIG. 7 is a flowchart describing an inattentive driving determination process B of the first embodiment. FIG. 8 is a flowchart describing an inattentive driving determination process C of the first embodiment. FIG. 9 is a drawing describing transition of the inattentive driving determination process of the first embodiment. Hereinafter, the inattentive driving determination process of the first embodiment will be described with reference to FIGS. 6 to 9.

(Inattentive Driving Determination Process A) As illustrated in FIG. 6, as soon as the inattentive driving determination process A starts, the host vehicle information acquisition part 32 acquires the information on the blinker as the host vehicle information (Step S101). Next, the control part 30 determines whether or not the right blinker of the host vehicle 1 is turned on (Step S102). When the control part 30 determines that the right blinker of the host vehicle 1 is turned on (Yes in Step S102), the setting part 34 sets the allowable range P in the direction of the driver D's sight as the second range P2 (Step S103), and the process proceeds to Step S106. On the other hand, when the control part 30 determines that the right blinker of the host vehicle 1 is turned off (No in Step S102), the control part 30 determines whether or not the left blinker of the host vehicle 1 is turned on (Step S104).

When the control part 30 determines that the left blinker of the host vehicle 1 is turned on (YES in Step S104), the setting part 34 sets the allowable range P in the direction of the driver D's sight as the first range P1 (Step S105), and the process proceeds to Step S106. On the other hand, when the setting part 34 determines that the left blinker of the host vehicle 1 is turned off (No in Step S104), the inattentive driving determination process A ends.

In Step S106, the driver information acquisition part 31 acquires the monitoring information on the driver D. Next, the inattentive driving determination part 35 determines whether or not the driver D is looking at the allowable range P set by the setting part 34 (Step S107). When the inattentive driving determination part 35 determines that the driver D is looking at the allowable range P set by the setting part 34 (Yes in Step S107), the inattentive driving determination process A ends.

On the other hand, when the inattentive driving determination part 35 determines that the driver D is looking outside the allowable range P set by the setting part 34 (No in Step S107), the control part 30 controls the sound output part 40 through the sound output control part 26 to warn the inattentive driving (Step S108), and the inattentive driving determination process A ends. In Step S108, the control part 30 may vibrate the vibration part 50, which is disposed in the seat surface 52 of the driver's seat 51, corresponding to the allowable range P set by the setting part 34 through the sound output control part 26. In Step S108, the control part 30 may display on the display part 60 through the information display control part 27 to warn the inattentive driving.

Before Step S108, the control part 30 may determine the necessity of a predetermined notification based on the allowable range P and the driver information on the driver D of the host vehicle 1. Alternatively, before Step S108, the control part 30 may determine the possibility of the predetermined notification based on the allowable range P and the driver information on the driver D of the host vehicle 1. Alternatively, before Step S108, the control part 30 may determine the inevitability of the predetermined notification based on the allowable range P and the driver information on the driver D of the host vehicle 1.

(Inattentive Driving Determination Process B) As illustrated in FIG. 7, as soon as the inattentive driving determination process B starts, the host vehicle information acquisition part 32 acquires the positional information on the host vehicle 1 as the host vehicle information (Step S201). Next, the host vehicle information acquisition part 32 acquires a traveling route of the host vehicle 1 as the host vehicle information (Step S202).

Next, the control part 30 determines whether or not the host vehicle 1 approaches a merging point at which the host vehicle 1 merges into the main lane from the merging lane (Step S203). When the control part 30 determines that the host vehicle 1 approaches the merging point at which the host vehicle 1 merges into the main lane from the merging lane (Yes in Step S203), the control part 30 determines whether or not the host vehicle 1 merges in the left direction from the traveling direction of the host vehicle 1 (Step S204).

When the control part 30 determines that the host vehicle 1 merges in the left direction from the traveling direction of the host vehicle 1 (Yes in Step S204), the setting part 34 sets the allowable range P in the direction of the driver D's sight as the first range P1 and the third range P3 (Step S205), and the process proceeds to Step S211. On the other hand, when the control part 30 determines that the host vehicle 1 merges in the right direction from the traveling direction of the host vehicle 1 (No in Step S204), the setting part 34 sets the allowable range P in the direction of the driver D's sight as the second range P2 and the fourth range P4 (Step S206), and the process proceeds to Step S211.

In Step S203, when the control part 30 determines that the host vehicle 1 does not approach the merging point at which the host vehicle 1 merges into the main lane from the merging lane (No in Step S203), the control part 30 determines whether or not the host vehicle 1 approaches the intersection at which the host vehicle 1 turns right (Step S207). When the control part 30 determines that the host vehicle 1 approaches the intersection at which the host vehicle 1 turns right (Yes in Step S207), the setting part 34 sets the allowable range P in the direction of the driver D's sight as the second range P2 (Step S208), and the process proceeds to Step S211. On the other hand, when the control part 30 determines that the host vehicle 1 does not approach the intersection at which the host vehicle 1 turns right (No in Step S207), the control part 30 determines whether or not the host vehicle 1 approaches the intersection at which the host vehicle 1 turns left (Step S209).

When the control part 30 determines that the host vehicle 1 approaches the intersection at which the host vehicle 1 turns left (Yes in Step S209), the setting part 34 sets the allowable range P in the direction of the driver D's sight as the first range P1 (Step S210), and the process proceeds to Step S211. On the other hand, when the control part 30 determines that the host vehicle 1 does not approach the intersection at which the host vehicle 1 turns left (No in Step S209), the inattentive driving determination process B ends.

In Step S211, the driver information acquisition part 31 acquires the monitoring information on the driver D (Step S211). Next, the inattentive driving determination part 35 determines whether or not the driver D is looking at the allowable range P set by the setting part 34 (Step S212).

When the inattentive driving determination part 35 determines that the driver D is looking at the allowable range P set by the setting part 34 (Yes in Step S212), the inattentive driving determination process B ends. On the other hand, when the inattentive driving determination part 35 determines that the driver D is not looking at the allowable range P set by the setting part 34 (No in Step S212), the control part 30 controls the sound output part 40 through the sound output control part 26 to warn the inattentive driving (Step S213), and the inattentive driving determination process B ends. In Step S213, the control part 30 may vibrate the vibration part 50, which is disposed in the seat surface 52 of the driver's seat 51, corresponding to the allowable range P set by the setting part 34 through the sound output control part 26. Alternatively, in Step S213, the control part may display on the display part 60 through the information display control part 27 to warn the inattentive driving.

Before Step S213, the control part 30 may determine the necessity of the predetermined notification based on the allowable range P and the driver information on the driver D of the host vehicle 1. Alternatively, before Step S213, the control part 30 may determine the possibility of the predetermined notification based on the allowable range P and the driver information on the driver D of the host vehicle 1. Alternatively, before Step S213, the control part 30 may determine the inevitability of the predetermined notification based on the allowable range P and the driver information on the driver D of the host vehicle 1.

(Inattentive Driving Determination Process C) As illustrated in FIG. 8, as soon as the inattentive driving determination process C starts, the another vehicle information acquisition part 33 acquires the another vehicle information (Step S301). Next, the control part 30 determines whether or not another vehicle that the host vehicle 1 may contact travels in the right direction of the host vehicle 1 (Step S302).

When the control part 30 determines that another vehicle that the host vehicle 1 may contact travels in the right direction of the host vehicle 1 (Yes in Step S302), the setting part 34 sets the allowable range P in the direction of the driver D's sight as the second range P2 and the fourth range P4 (Step S304), and the process proceeds to Step S306. On the other hand, when the control part 30 determines that another vehicle that the host vehicle 1 may contact does not travel in the right direction of the host vehicle 1 (No in Step S302), the control part 30 determines whether or not another vehicle that the host vehicle 1 may contact travels in the left direction of the host vehicle 1 (Step S303).

When the control part 30 determines that another vehicle that the host vehicle 1 may contact travels in the left direction of the host vehicle 1 (Yes in Step S303), the setting part 34 sets the allowable range P in the direction of the driver D's sight as the first range P1 and the third range P3 (Step S305), and the process proceeds to Step S306. On the other hand, when the control part 30 determines that another vehicle that the host vehicle 1 may contact does not travel in the left direction of the host vehicle 1 (No in Step S303), the inattentive driving determination process C ends.

In Step S306, the driver information acquisition part 31 acquires the monitoring information on the driver D (Step S306). Next, the inattentive driving determination part 35 determines whether or not the driver D is looking at the allowable range P set by the setting part 34 (Step S307).

When the inattentive driving determination part 35 determines that the driver D is looking at the allowable range P set by the setting part 34 (Yes in Step S307), the inattentive driving determination process C ends. On the other hand, when the inattentive driving determination part 35 determines that the driver D is not looking at the allowable range P set by the setting part 34 (No in Step S307), the control part 30 controls the sound output part 40 through the sound output control part 26 to warn the inattentive driving (Step S308), and the inattentive driving determination process C ends. In Step S308, the control part 30 may vibrate the vibration part 50, which is disposed in the seat surface 52 of the driver's seat 51, corresponding to the allowable range P set by the setting part 34 through the sound output control part 26. Alternatively, the control part 30 may display on the display part 60 through the information display control part 27 to warn the inattentive driving.

Before Step S308, the control part 30 may determine the necessity of the predetermined notification based on the allowable range P and the driver information on the driver D of the host vehicle 1. Alternatively, before Step S308, the control part 30 may determine the possibility of the predetermined notification based on the allowable range P and the driver information on the driver D of the host vehicle 1. Alternatively, before Step S308, the control part 30 may determine the inevitability based on the allowable range P and the driver information on the driver D of the host vehicle 1. Alternatively, the control part 30 may determine the presence/absence of the traffic light on the road on which the host vehicle 1 travels with the map information and the camera provided in the host vehicle 1, for example, to set the allowable range P as the first range P1 and the second range P2 at the intersection without the traffic light.

(Change in Inattentive Driving Determination Process) As illustrated in FIG. 9, during the inattentive driving determination process B or the inattentive driving determination process C, when the host vehicle information acquisition part 32 acquires the information on which the right blinker or the left blinker of the host vehicle 1 is turned on, the process is changed to the inattentive driving determination process A to be executed.

Figure 10:
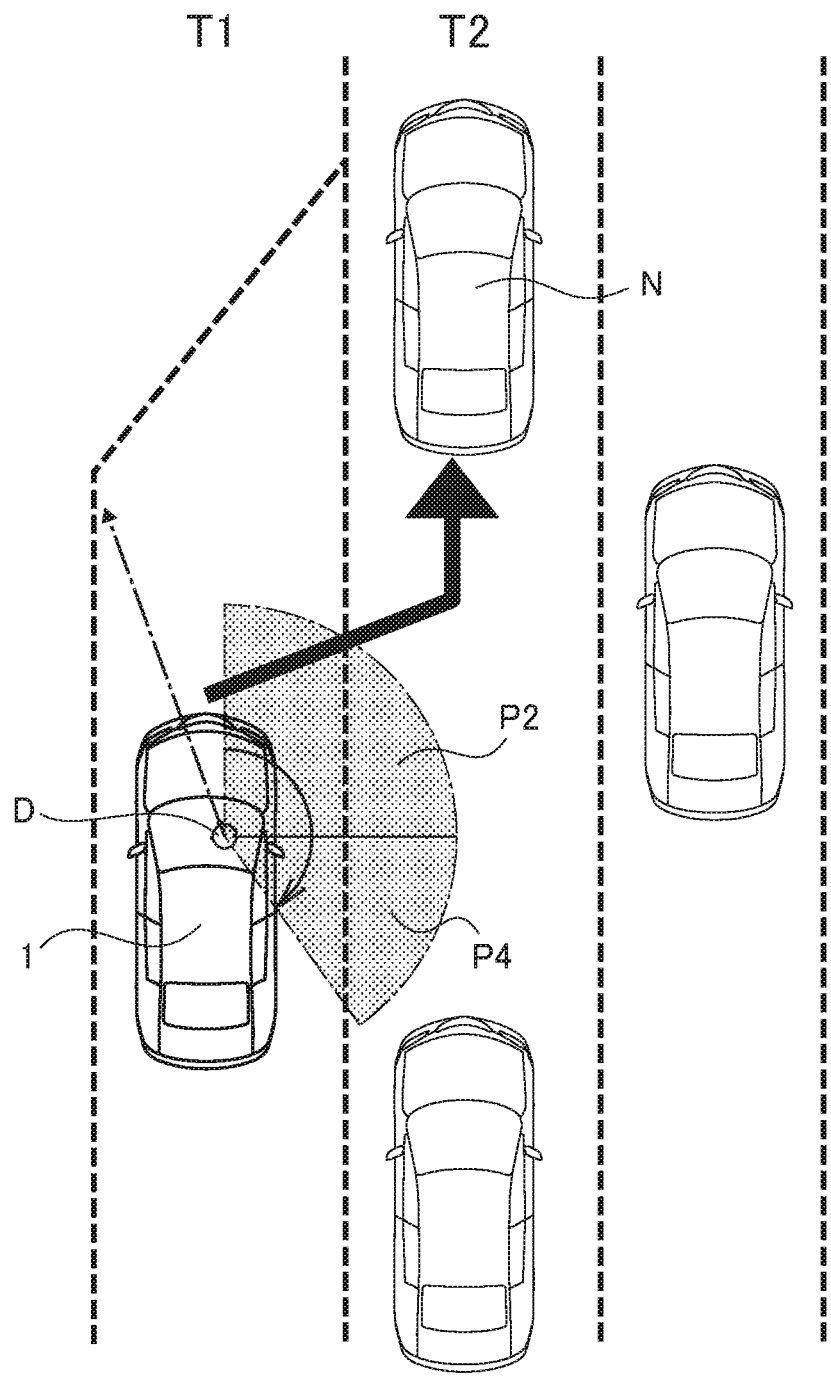
FIG. 10 is a drawing describing an operation of the on-vehicle information processing device of the first embodiment.
Figure 11:
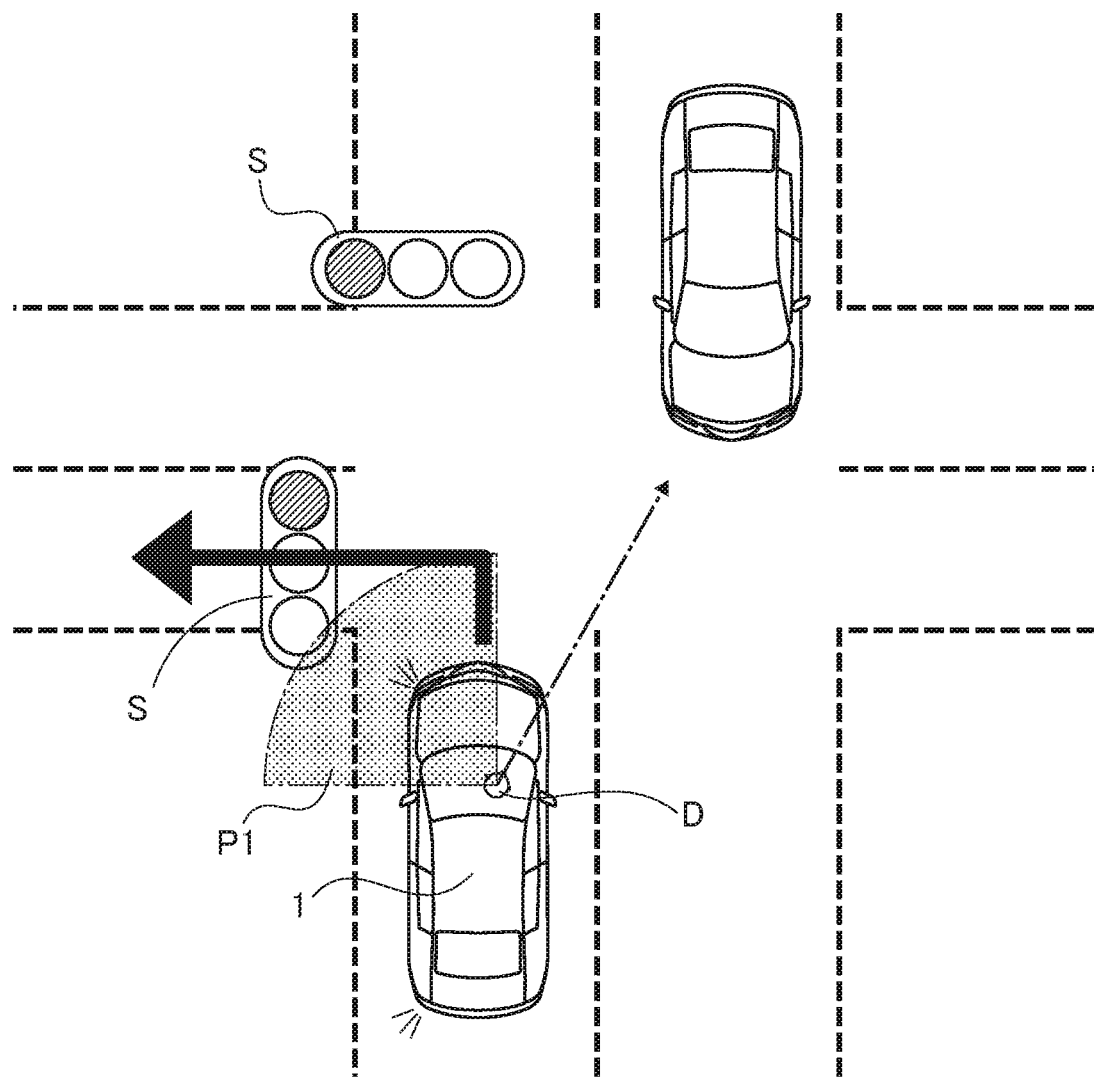
FIG. 11 is a drawing describing the operation of the on-vehicle information processing device of the first embodiment.
Figure 12:
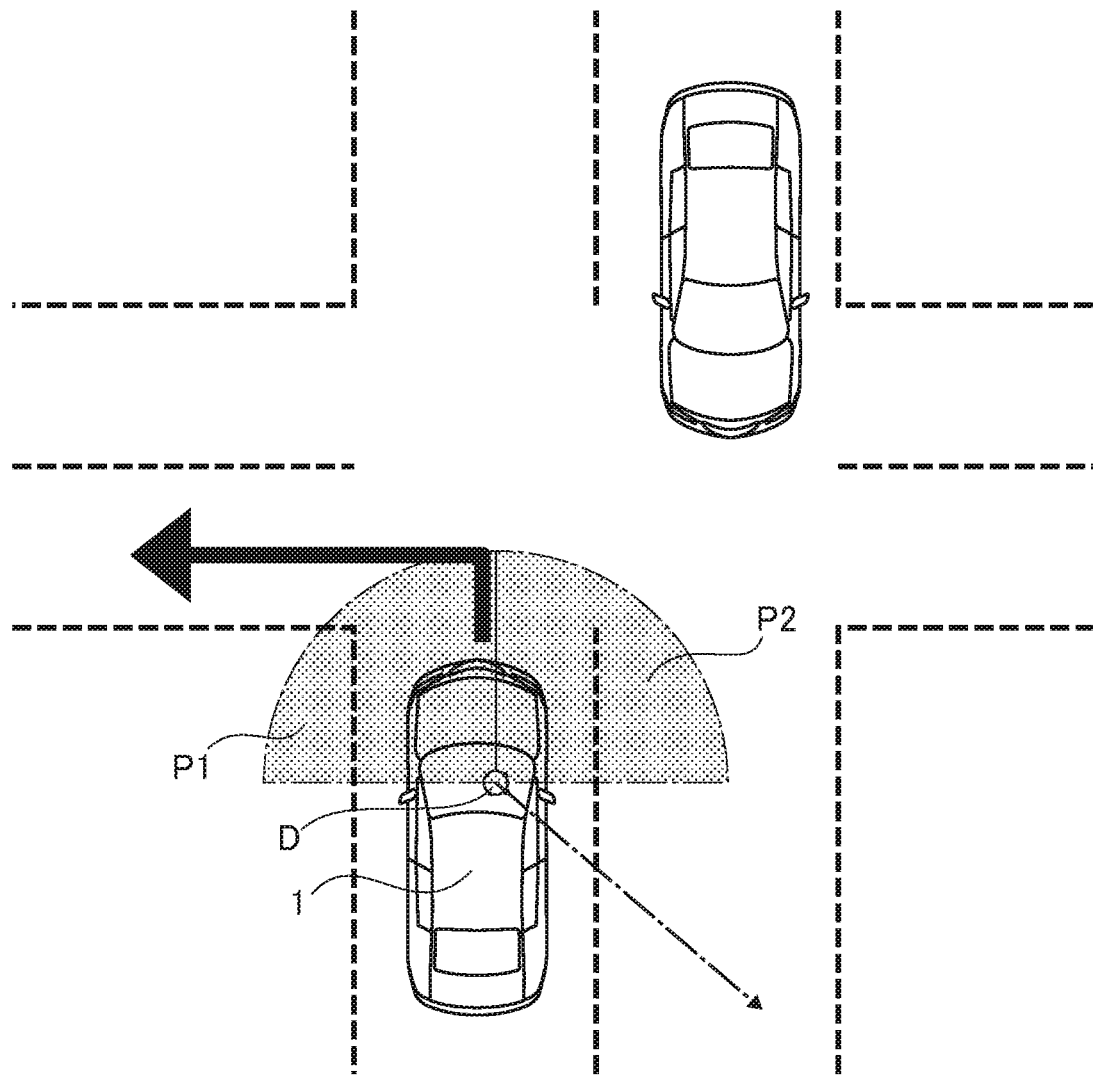
FIG. 12 is a drawing describing the operation of the on-vehicle information processing device of the first embodiment.
Figure 13:
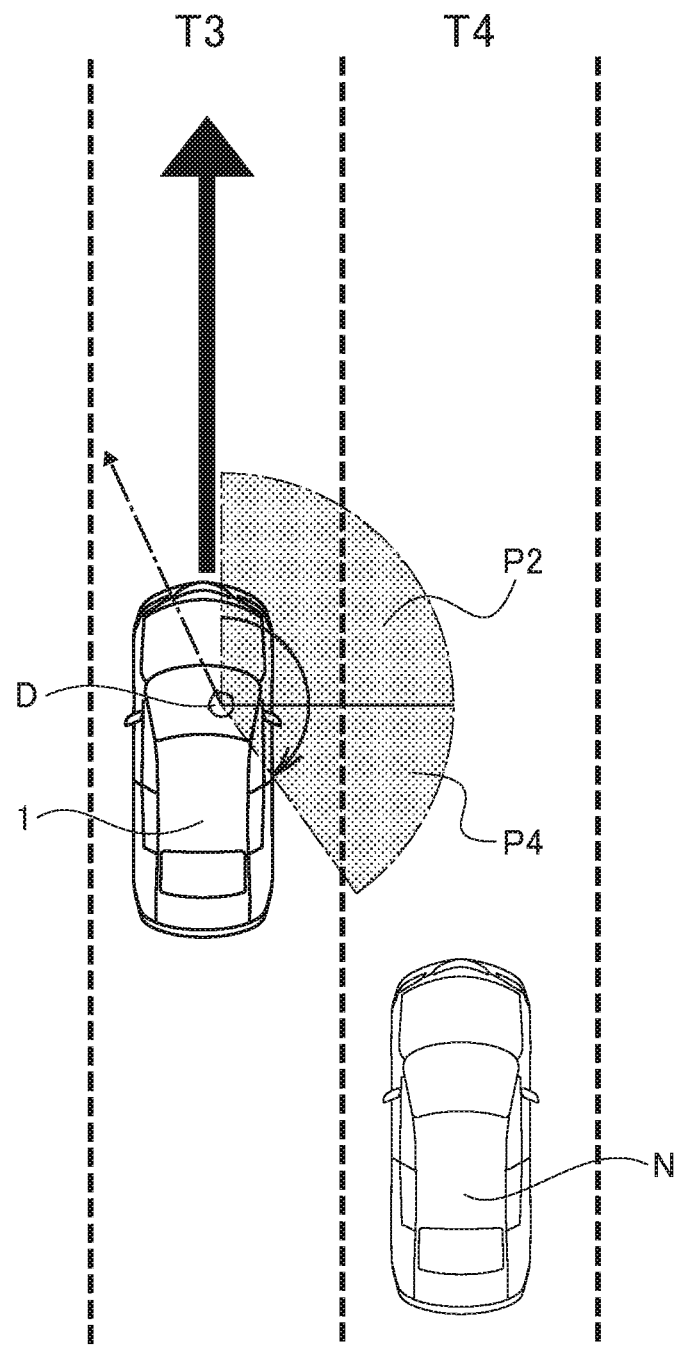
FIG. 13 is a drawing describing the operation of the on-vehicle information processing device of the first embodiment.

(Operation of ON-Vehicle Information Processing Device) FIG. 10 is a drawing describing the operation of the on-vehicle information processing device 10 of the first embodiment. FIG. 11 is a drawing describing the operation of the on-vehicle information processing device 10 of the first embodiment. FIG. 12 is a drawing describing the operation of the on-vehicle information processing device 10 of the first embodiment. FIG. 13 is a drawing describing the operation of the on-vehicle information processing device 10 of the first embodiment. Hereinafter, the operations of the on-vehicle information processing device 10 of the first embodiment will be described with reference to FIGS. 10 to 13.

As illustrated in FIG. 10, the host vehicle 1 is traveling on a merging lane T1 of a freeway, and is about to merge into a main lane T2 which another vehicle N occupies. In this situation, the allowable range P for the driver D's sight is set as the second range P2 and the fourth range P4 (Step S206 of FIG. 7). When the driver D is looking at outside the second range P2 and the fourth range P4, the display part 60 displays an image "please keep your eyes on the road", and the sound output part 40 makes a sound "please keep your eyes on the road", and the right front vibration part 50*b* and the right rear vibration part 50*c* vibrate (Step S213).

As illustrated in FIG. 11, the host vehicle 1 is about to turn left at the intersection with a traffic light S by turning on the left blinker. In this situation, the allowable range P for the driver D's sight is set as the first range P1 (Step S105 in FIG. 6). When the driver D is looking outside the first range P1, the display part 60 displays the image "please keep your eyes on the road", and the sound output part 40 makes the sound "please keep your eyes on the road", and the left front vibration part 50*a* vibrates (Step S108).

As illustrated in FIG. 12, the host vehicle 1 is about to turn left at the intersection without the traffic light. In this situation, the allowable range P for the driver D's sight is set as the first range P1 and the second range P2 (Step S210 in FIG. 7). When the driver D is looking outside the first range P1 and the second range P2, the display part 60 displays the image "please keep your eyes on the road", and the sound output part 40 makes the sound "please keep your eyes on the road", and the left front vibration part 50*a* and the right front vibration part 50*b* vibrate (Step S213).

As illustrated in FIG. 13, while the host vehicle 1 is traveling on a left lane T3, another vehicle N traveling on a right lane T4 at a fast speed is approaching the host vehicle 1 from the back of the host vehicle 1. In this situation, the allowable range P for the driver D's sight is set as the second range P2 and the fourth range P4 (Step S304 in FIG. 8). When the driver D is looking outside the second range P2 and the fourth range P4, the display part 60 displays an image "please confirm safety", and the sound output part 40 makes a sound "please confirm safety", and the right front vibration part 50*b* and the right rear vibration part 50*c* vibrate (Step S308).

The on-vehicle information processing device 10 of the first embodiment includes the host vehicle information acquisition part 32 that acquires the host vehicle information on the host vehicle 1, the setting part 34 that sets the allowable range P for the driver D's sight of the host vehicle 1 based on the host vehicle information, the driver information acquisition part 31 that acquires the driver information on the driver D, the determination part (inattentive driving determination part 35) that determines whether or not the driver D is looking at the allowable range P based on the allowable range P and the driver information, and the output part (sound output part 40, vibration part 50, display part 60) that outputs the predetermined notification based on the determination of the determination part (inattentive driving determination part 35) (FIG. 6).

With this configuration, the location where safety confirmation is required, for example, an intersection, is specified based on the host vehicle information such as the information on the blinker, and the allowable range P for the driver D's sight in that location can be set. When the driver D is not looking at the direction in which the safety confirmation is required in the location where the safety confirmation is required, the necessity of the safety confirmation can be notified. On the other hand, when the driver D is looking at the direction in which the safety confirmation is required in the location where the safety confirmation is required, the driver can be prevented from being determined as inattentively driving. As a result, an unnecessary notification can be prevented.

The on-vehicle information processing device 10 of the first embodiment includes the another vehicle information acquisition part 33 that acquires the another vehicle information on another vehicle N. The setting part 34 sets the allowable range P based on the another vehicle information (FIG. 8).

The location where the safety confirmation is required such as a location where another vehicle N approaches the host vehicle 1 is thereby specified based on the another vehicle information acquired from at least one of the outside cameras 12 to 15 and the sonar, and the allowable range P for the driver D's sight in that location can be set. When the driver D is not looking at the direction in which the safety confirmation is required by the driver D in the location where the safety confirmation is required, the necessity of the safety confirmation can be notified. On the other hand, when the driver D is looking at the direction in which the safety confirmation is required by the driver D in the location where the safety confirmation is required, the driver is prevented from being determined as inattentively driving. As a result, an unnecessary notification can be prevented.

In the on-vehicle information processing device 10 of the first embodiment, the host vehicle information includes the positional information on the position of the host vehicle 1, and the setting part 34 sets the allowable range P based on the positional information (FIG. 7).

The location where the safety confirmation is required such as a merging point and an intersection is thereby specified based on the positional information on the host vehicle 1, and the allowable range P for the driver D's sight in that location can be set. Accordingly, when the driver D is not looking at the direction in which the safety confirmation is required by the driver D in the location where the safety confirmation is required, the necessity of the safety confirmation can be notified. On the other hand, when the driver D is looking at the direction in which the safety confirmation is required by the driver D in the location where the safety confirmation is required, the driver can be prevented from being determined as inattentively driving. As a result, an unnecessary notification can be prevented.

The on-vehicle information processing method of the first embodiment includes a host vehicle information acquisition step (Step S101 in FIG. 6) of acquiring host vehicle information on the host vehicle 1, a setting step (Steps S103, S105) of setting the allowable range P for the driver D's sight of the host vehicle 1, a driver information acquisition step (Step S106) of acquiring the driver information on the driver D, a determination step (Step S107) of determining whether or not the driver D is looking at the allowable range P based on the allowable range P and the driver information, and an output step (Step S108) of outputting a predetermined notification based on the determination of the determination step (FIG. 6).

The location where the safety confirmation is required such as an intersection is thereby specified based on the host vehicle information such as the information on the blinker, and the allowable range P for the driver D's sight in that location can be set. Accordingly, when the driver D is not looking at the direction in which the safety confirmation is required in the location where the safety confirmation is required, the necessity of the safety confirmation can be notified. On the other hand, when the driver D is looking at the direction in which the safety confirmation is required in the location where the safety confirmation is required, the driver can be prevented from being determined as inattentively driving. As a result, an unnecessary notification can be prevented.

The on-vehicle information processing method includes an another vehicle information acquisition step (Step S301 in FIG. 8) of acquiring the another vehicle information on the another vehicle N, and the setting step (Steps S304, S305) sets the allowable range P based on the another vehicle information (FIG. 8).

The location where the safety confirmation is required such as a location where the another vehicle N approaches the host vehicle 1 is thereby specified based on the another vehicle information acquired from the outside cameras 12 to 15, and the allowable range P for the driver D's sight in that location can be set. Accordingly, when the driver D is not looking at the direction in which the safety confirmation is required in the location where the safety confirmation is required, the safety confirmation can be notified. On the other hand, when the driver D is looking at the direction in which the safety confirmation is required in the location where the safety confirmation is required, the driver can be prevented from being determined as inattentively driving. As a result, an unnecessary notification can be prevented.

In the on-vehicle information processing method of the first embodiment, the host vehicle information includes the positional information on the position of the host vehicle 1 (Step S201 in FIG. 7), and the setting step (Steps S205, S206, S208, S210) sets the allowable range P based on the positional information (FIG. 7).

The location where the safety confirmation is required such as a merging point and an intersection is thereby specified based on the positional information on the host vehicle 1, and the allowable range P for the driver D's sight in that location can be set. Accordingly, when the driver D is not looking at the direction in which the safety confirmation is required in the location where the safety confirmation is required, the necessity of the safety confirmation can be notified. On the other hand, when the driver D is looking at the direction in which the safety confirmation is required in the location where the safety confirmation is required, the driver can be prevented from being determined as inattentively driving. As a result, an unnecessary notification can be prevented.

At the intersection with the traffic light, when the traffic light of the lane on which the host vehicle 1 travels is blue, the traffic light of the lane intersecting with the lane on which the host vehicle 1 travels is red. Accordingly, there is almost no need for the driver D of the host vehicle 1 to pay attention to another vehicle traveling on the lane intersecting with the lane on which the host vehicle 1 travels and the direction opposite to the direction in which the host vehicle 1 turns. For this reason, at the intersection with the traffic light, it is appropriate to set the allowable range P for the driver D's sight as the first range P1 or the second range P2.

On the other hand, at the intersection without the traffic light, another vehicle may travel on the lane intersecting with the lane on which the host vehicle 1 travels. Accordingly, there is high necessity for the driver D of the host vehicle 1 to pay attention to the lane intersecting with the lane on which the host vehicle 1 travels, and to look at the direction opposite to the direction in which the host vehicle 1 turns. For this reason, at the intersection without the traffic light, it is appropriate to set the allowable range P for the driver D's sight as the first range P1 and the second range P2.

With this configuration, the driver D is not notified even when the driver D is looking in the direction opposite to the direction in which the host vehicle 1 turns at the intersection without the traffic light. This configuration contributes to reduce the notification in unnecessary timing for the driver and the complicated warning.

Second Embodiment

An on-vehicle information processing device and an on-vehicle information processing method of the second embodiment will be described. The same terms and the same reference numbers as those in the first embodiment are used for the parts which are the same or similar to those in the first embodiment.

The on-vehicle information processing device and the on-vehicle information processing method of the second embodiment differ from the on-vehicle information processing device and the on-vehicle information processing method of the first embodiment in that the on-vehicle information processing device and the on-vehicle information processing method of the second embodiment include an obstacle information acquisition part and an obstacle determination part.

Figure 14:
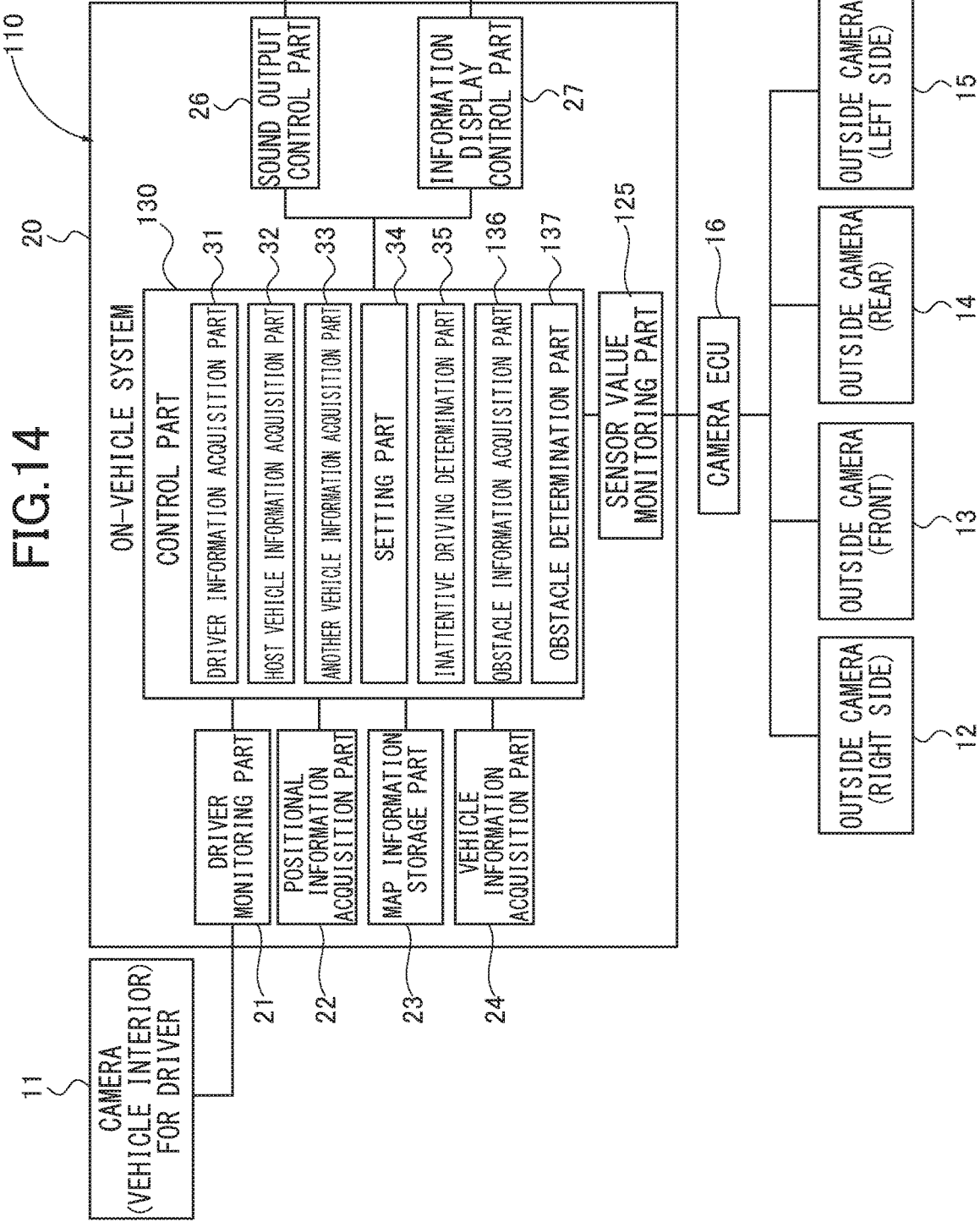
FIG. 14 is a block diagram illustrating a configuration of an on-vehicle information processing device of a second embodiment.

(Configuration of On-Vehicle Information Processing Device) FIG. 14 is a view illustrating the configuration of the on-vehicle information processing device 110 of the second embodiment. Hereinafter, the configuration of the on-vehicle information processing device 110 of the second embodiment will be described with reference to FIG. 14.

The sensor value monitoring part 125 is connected to the camera ECU 16 to monitor another vehicle approaching the host vehicle 1 from the image data photographed by the outside cameras 12 to 15 and the sonar data acquired by the sonar. The sensor value monitoring part 125 monitors obstacles around the host vehicle 1 from the image data photographed by the outside cameras 12 to 15 and the sonar data acquired by the sonar. The obstacle obstructs the traveling of the host vehicle 1, and includes, for example, a wall along a road, a pylon placed on a road, a falling object on a road, another vehicle parked on a road, a depressed part on a road, and a front vehicle in the traveling direction of the host vehicle 1. When monitoring the obstacle around the host vehicle 1, both of or one of the image data and the sonar data may be used. The sensor value monitoring part 125 is connected to the control part 30 to send the another vehicle information and the obstacle information as the monitoring information to the control part 30.

As illustrated in FIG. 14, the control part 130 includes an obstacle information acquisition part 136 and an obstacle determination part 137.

The obstacle information acquisition part 136 acquires the obstacle information on the obstacle during the traveling of the host vehicle 1 from the monitoring information by the sensor value monitoring part 125. The obstacle determination part 137 determines whether or not a distance between the host vehicle 1 and the obstacle in front of the host vehicle 1 in the traveling direction is sufficient based on the obstacle information acquired by the obstacle information acquisition part 136.

Figure 15:
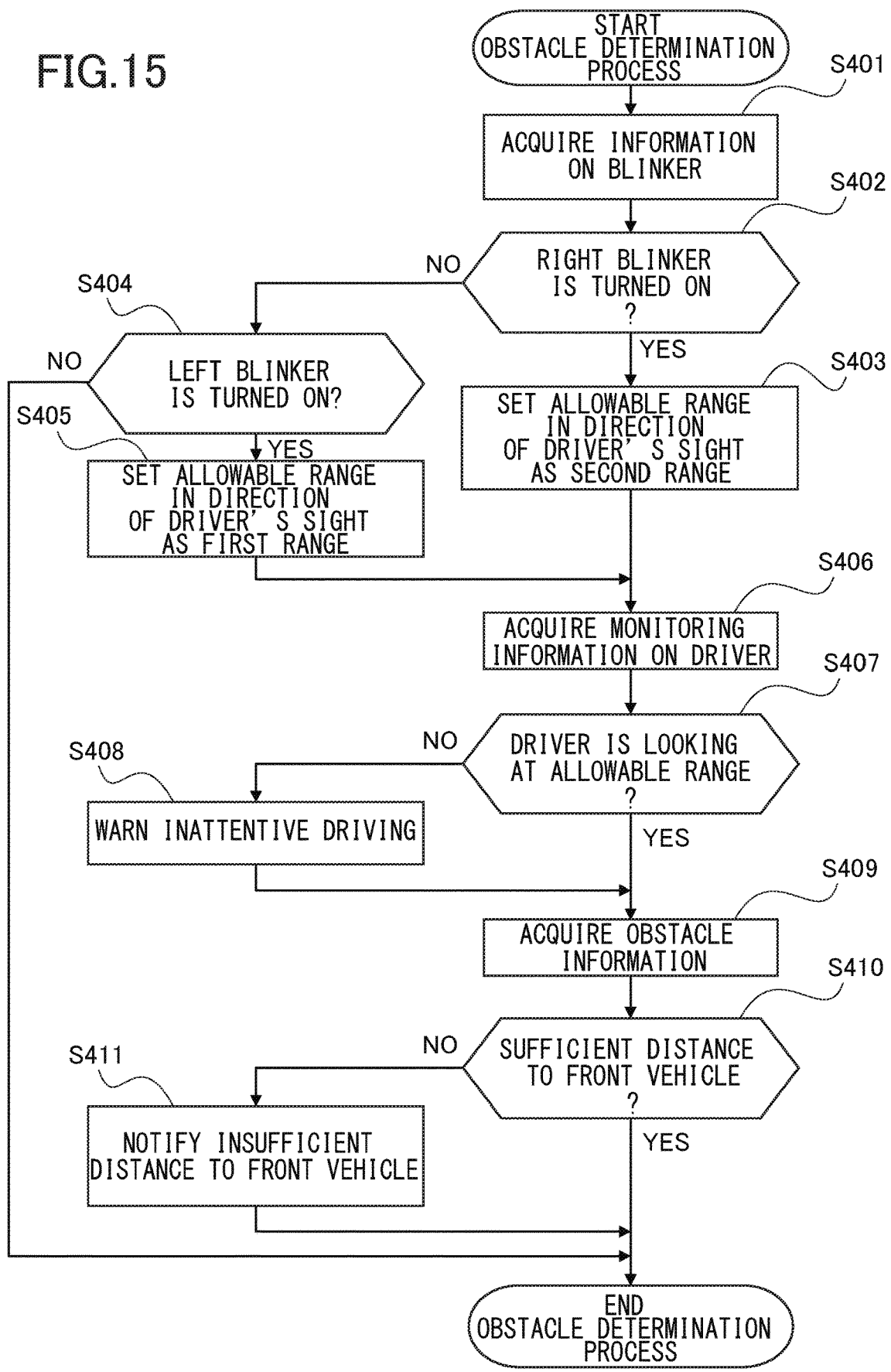
FIG. 15 is a flowchart describing an obstacle determination process of the second embodiment.

(Obstacle Determination Process) FIG. 15 is a flowchart describing an obstacle determination process of the second embodiment. Hereinafter, the obstacle determination process of the second embodiment will be described with reference to FIG. 15. The obstacle determination process can be executed when acquiring the blinker information (inattentive driving determination process A of first embodiment), when acquiring the positional information on the host vehicle 1 (inattentive driving determination process B of first embodiment), and when acquiring the another vehicle information (inattentive driving determination process C of first embodiment). In the second embodiment, as one example, the obstacle determination process is executed when acquiring the blinker information (inattentive driving determination process A of first embodiment).

(Obstacle Determination Process) As illustrated in FIG. 15, as soon as the obstacle determination process starts, the host vehicle information acquisition part 32 acquires the information on the blinker as the host vehicle information (Step S401). Next, the control part 130 determines whether or not the right blinker of the host vehicle 1 is turned on (Step S402).

When the control part 130 determines that the right blinker of the host vehicle 1 is turned on (Yes in Step S402), the setting part 34 sets the allowable range P in the direction of the driver D's sight as the second range P2 (Step S403), and the process proceeds to Step S406. On the other hand, when the control part 130 determines that the right blinker of the host vehicle 1 is turned off (NO in Step S402), the control part 130 determines whether or not the left blinker of the host vehicle 1 is turned on (Step S404).

When the control part 130 determines that the left blinker of the host vehicle 1 is turned on (Yes in Step S404), the setting part 34 sets the allowable range P in the direction of the driver D's sight as the first range P1 (Step S405), and the process proceeds to Step S406. On the other hand, when the control part 130 determines that the left blinker of the host vehicle 1 is turned off (NO in Step S404), the obstacle determination process ends.

In Step S406, the driver information acquisition part 31 acquires the monitoring information on the driver D. Next, the inattentive driving determination part 35 determines whether or not the driver D is looking at the allowable range P set by the setting part 34 (Step S407).

When the inattentive driving determination part 35 determines that the driver D is looking at the allowable range P set by the setting part 34 (YES in Step S407), the process proceeds to Step S409. On the other hand, when the inattentive driving determination part 35 determines that the driver D is looking outside the allowable range P set by the setting part 34 (NO in Step S407), the control part 130 controls the sound output part 40 through the sound output control part 26 to warn the inattentive driving (Step S408), and the process proceeds to Step S409. In Step S408, the control part 130 may vibrate the vibration part 50, which is disposed in the seat surface 52 of the driver's seat 51, corresponding to the allowable range P set by the setting part 34 through the sound output control part 26. In Step S408, the control part 130 may display on the display part 60 through the information display control part 27 to warn the inattentive driving.

In Step S409, the obstacle information acquisition part 136 acquires the obstacle information. Next, the obstacle determination part 137 determines whether or not a distance to another vehicle as a front obstacle is sufficient (Step S410).

When the obstacle determination part 137 determines a sufficient distance to another vehicle (YES in Step S410), the obstacle determination process ends. On the other hand, when the obstacle determination part 137 determines an insufficient distance to another vehicle (NO in Step S410), the control part 130 controls the sound output part 40 through the sound output control part 26 to notify the insufficient distance to the front vehicle (Step S411), and the obstacle determination process ends. In Step S411, the control part 130 may vibrate the left front vibration part 50a and the right front vibration part 50b through the sound output control part 26. In Step S411, the control part 130 may display the notification as the insufficient distance to the front vehicle on the display part 60 through the information display control part 27.

Figure 16:
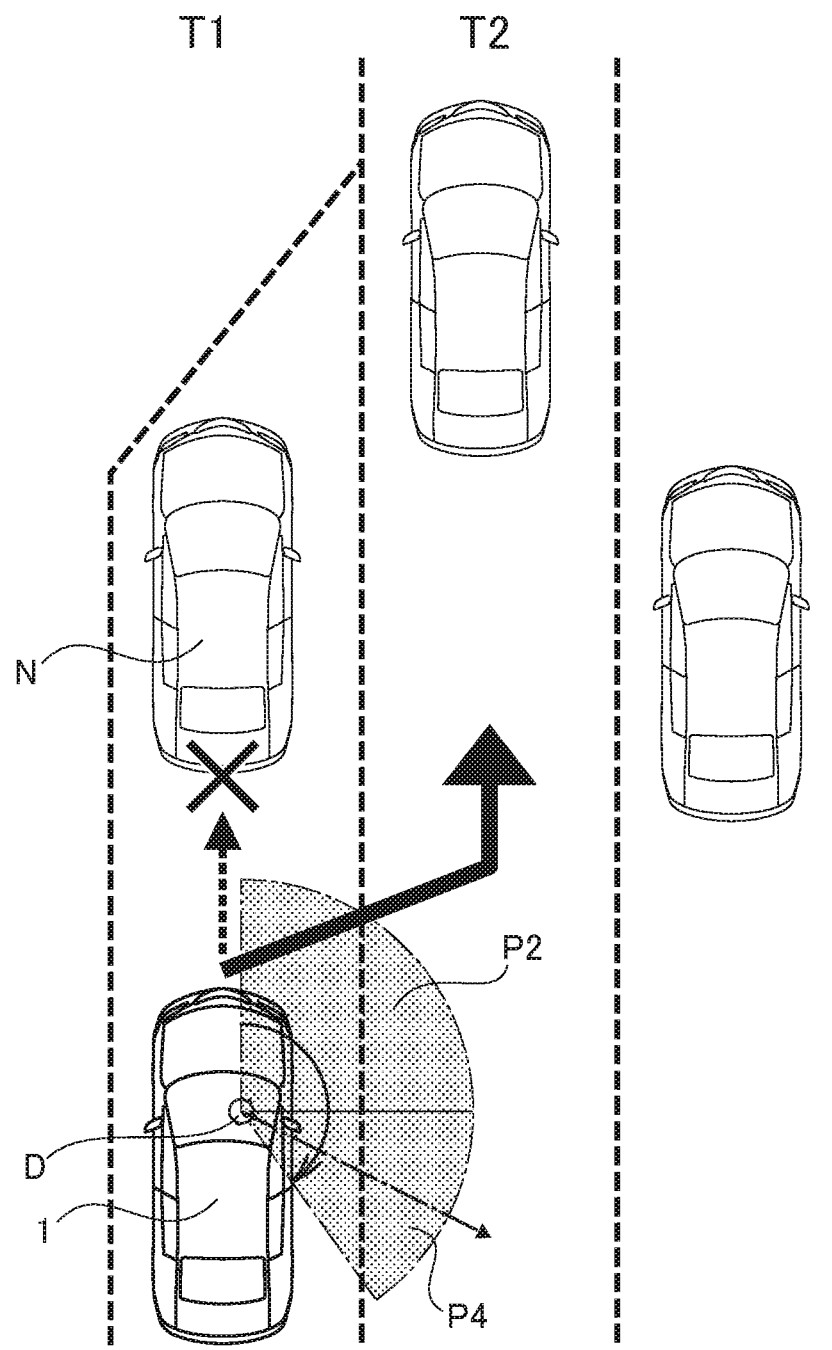
FIG. 16 is a drawing describing an operation of an on-vehicle information processing device of the second embodiment.
Figure 17:
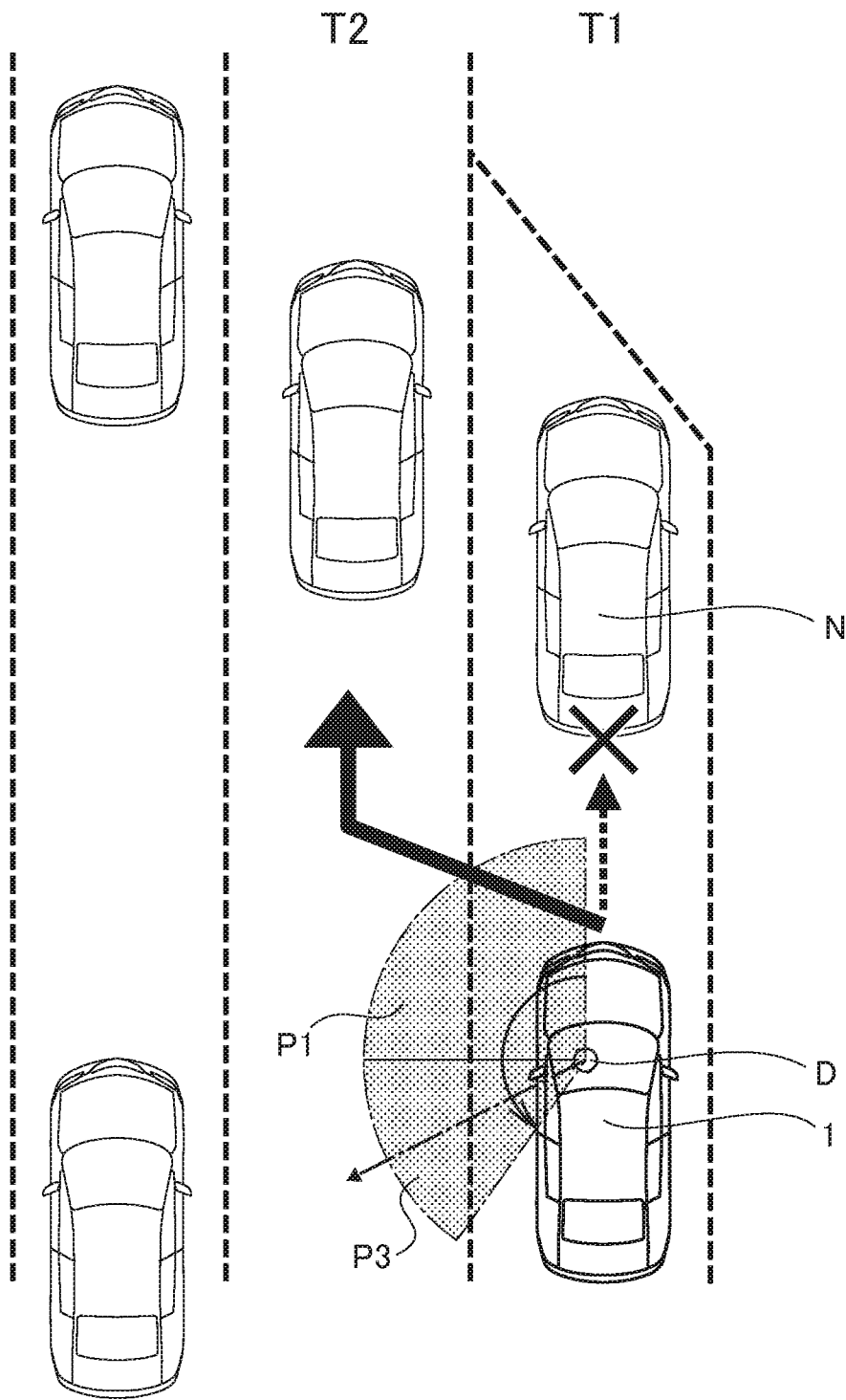
FIG. 17 is a drawing describing the operation of the on-vehicle information processing device of the second embodiment.
Figure 18:
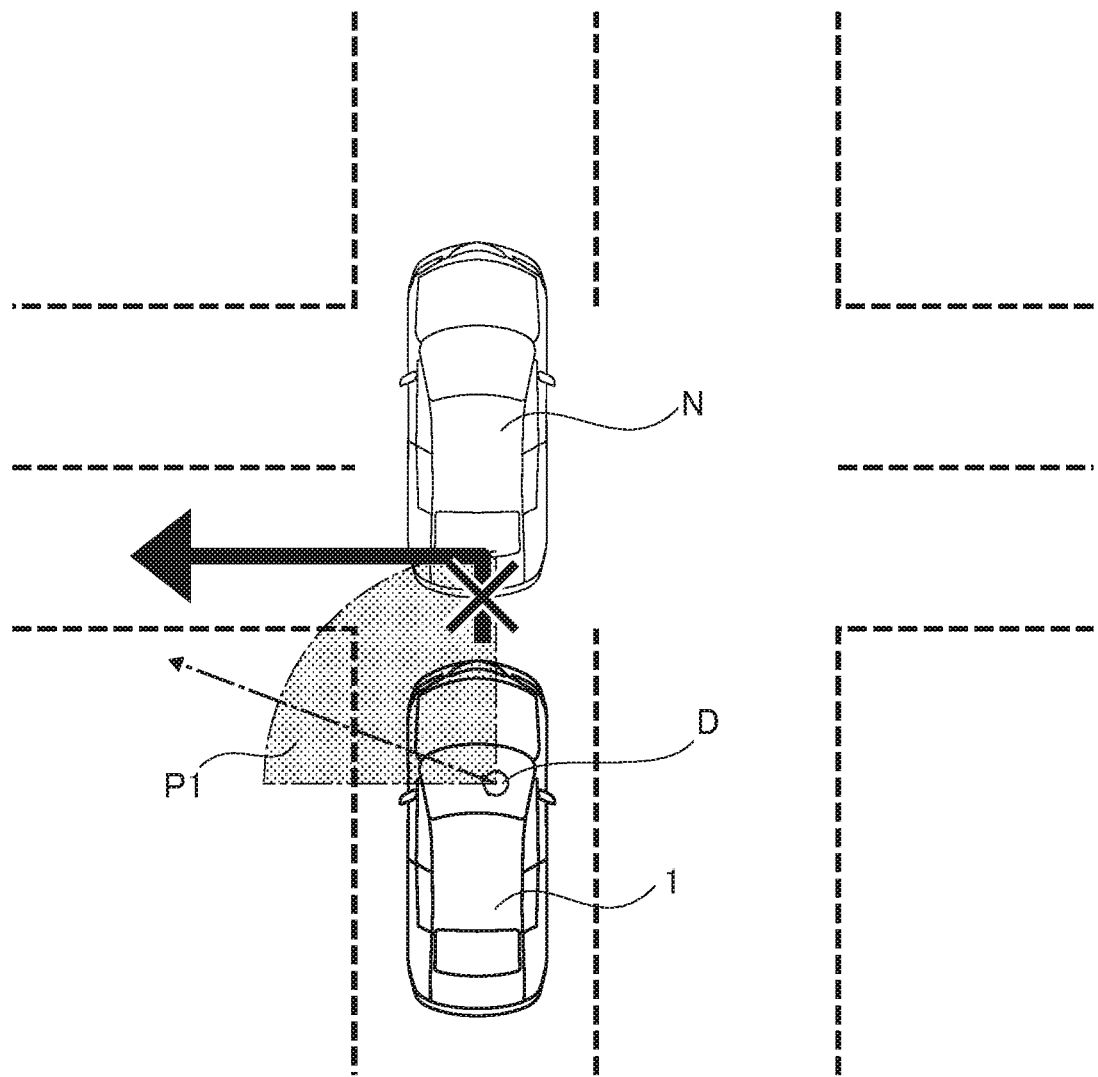
FIG. 18 is a drawing describing the operation of the on-vehicle information processing device of the second embodiment.
Figure 19:
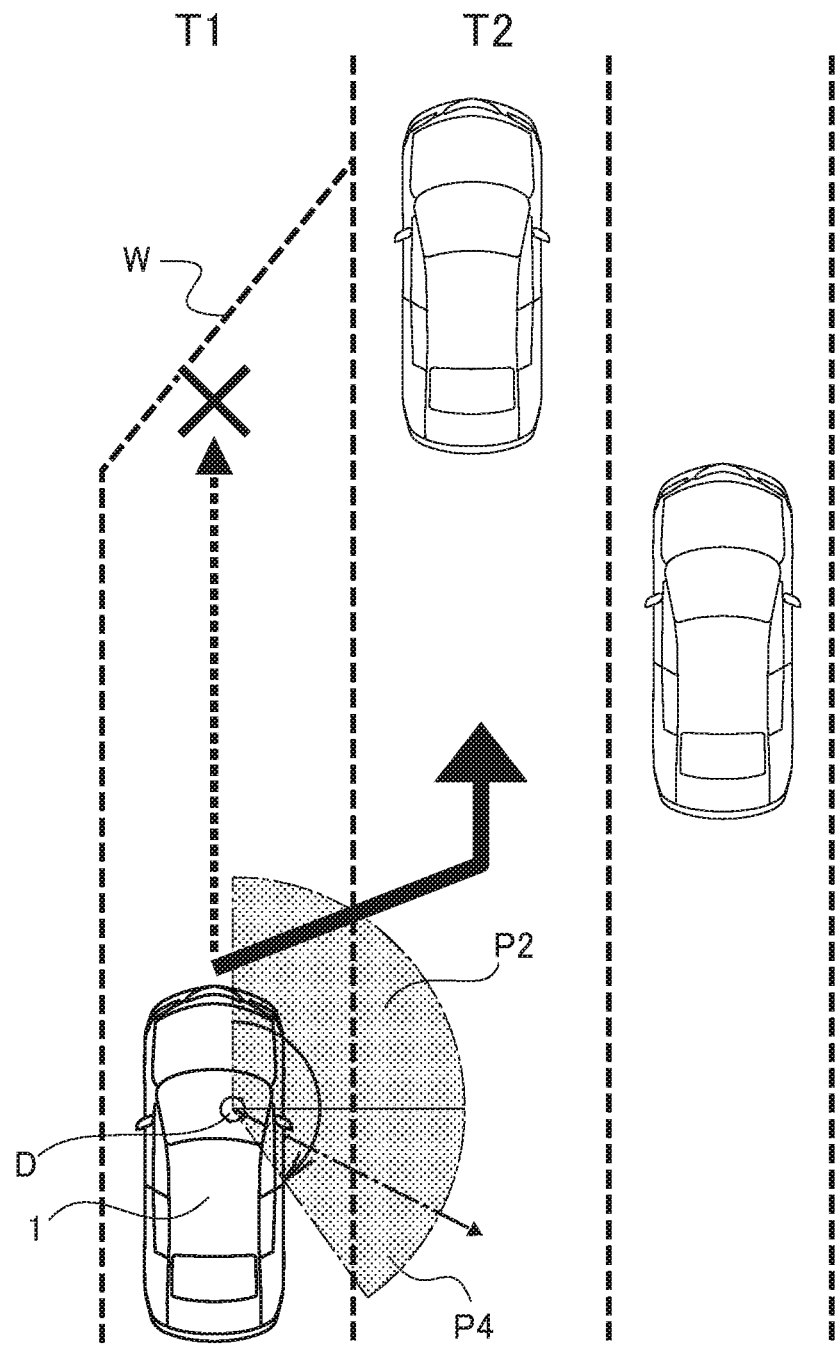
FIG. 19 is a drawing describing the operation of the on-vehicle information processing device of the second embodiment.
Figure 20:
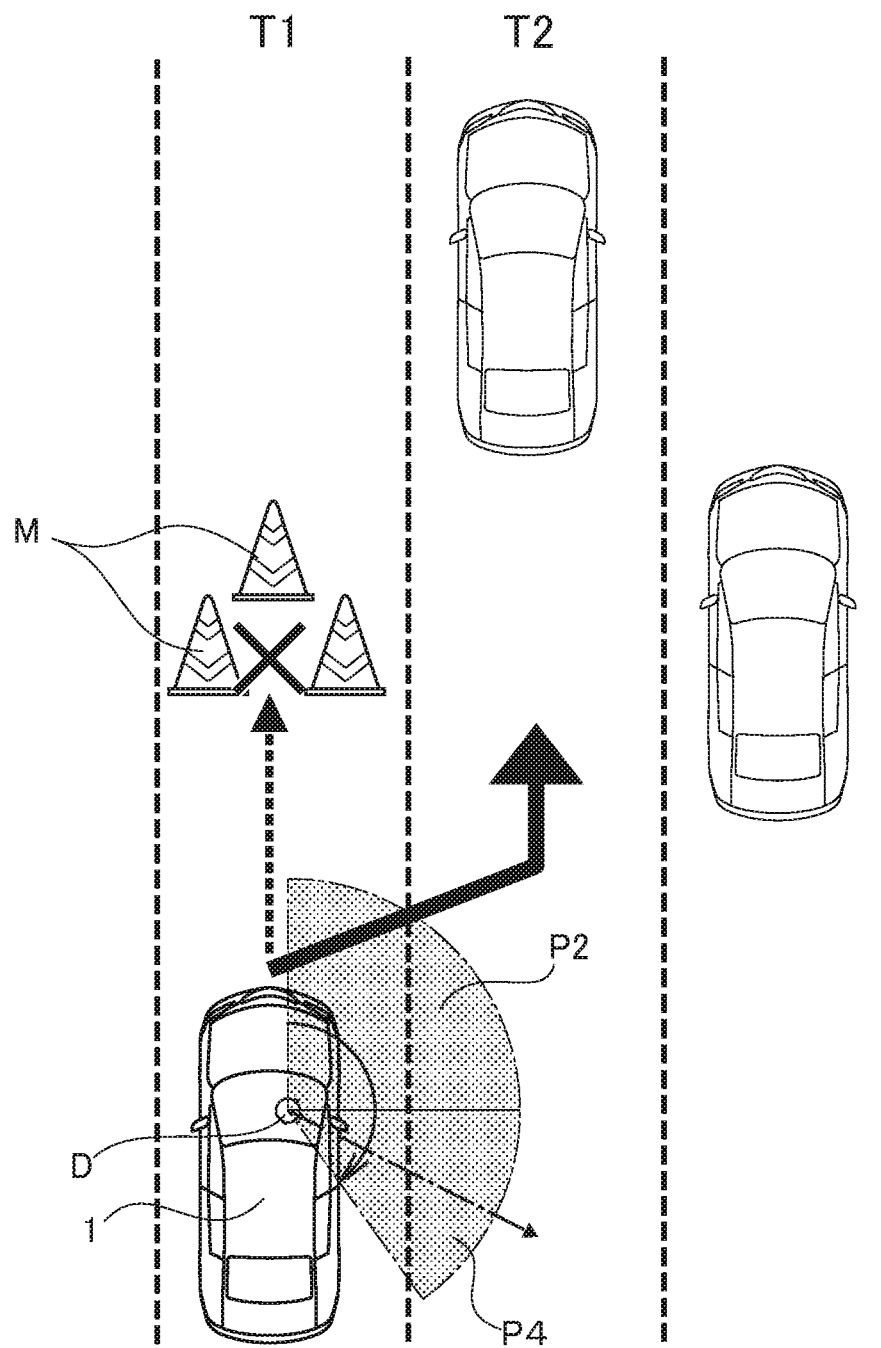
FIG. 20 is a drawing describing the operation of the on-vehicle information processing device of the second embodiment.

(Operation of On-Vehicle Information Processing Device) FIG. 16 is a drawing describing the operation of the on-vehicle information processing device 110 of the second embodiment. FIG. 17 is a drawing describing the operation of the on-vehicle information processing device 110 of the second embodiment. FIG. 18 is a drawing describing the operation of the on-vehicle information processing device 110 of the second embodiment. FIG. 19 is a drawing describing the operation of the on-vehicle information processing device 110 of the second embodiment. FIG. 20 is a drawing describing the operation of the on-vehicle information processing device 110 of the second embodiment. Hereinafter, the operation of the on-vehicle information processing device 110 of the second embodiment will be described with reference to FIGS. 16 to 20.

As illustrated in FIG. 16, the host vehicle 1 is traveling on the merging lane T1 of a freeway, and is about to merge into the main lane T2. In this situation, the allowable range P for the driver D's sight is set as the second range P2 and the fourth range P4. When the driver D is looking at the second range P2 and the fourth range P4, the display part 60, the sound output part 40, and the vibration part 50 output no safety confirmation. However, when a distance between the host vehicle 1 and the front another vehicle N is insufficient, the display part 60 displays on an image "please pay attention to the front vehicle", and the sound output part 40 makes a sound "please pay attention to the front vehicle", and the left front vibration part 50a and the right front vibration part 50b vibrate (Step S411 in FIG. 15).

As illustrated in FIG. 17, the host vehicle 1 is traveling on the merging lane T1 of the freeway, and is about to merge into the main lane T2. In this case, the allowable range P for the driver D's sight is set as the first range P1 and the third range P3. When the driver D is looking at the first range P1 and the third range P3, the display part 60, the sound output part 40, and the vibration part 50 output no safety confirmation. However, when the distance between the host vehicle 1 and the front another vehicle N is insufficient, the display part 60 displays the image "please pay attention to the front vehicle", the sound output part 40 makes the sound "please pay attention to the front vehicle", and the left front vibration part 50a and the right front vibration part 50b vibrate (Step S411 of FIG. 15).

As illustrated in FIG. 18, the host vehicle 1 is about to turn left at the intersection without the traffic light. In this case, the allowable range P for the driver D's sight is set as the first range P1. When the driver D is looking at the first range P1, the display part 60, the sound output part 40, and the vibration part 50 output no safety confirmation. When the driver D is not looking at the first range P1, the display part 60, the sound output part 40, and the vibration part 50 output safety confirmation. However, when the distance between the host vehicle 1 and the front another vehicle N is insufficient, the driver D needs to pay attention to the front of the host vehicle 1, and the display part 60 displays the image "please play attention to the front vehicle", the sound output part 40 make the sound "please pay attention to the front vehicle", and the left front vibration part 50a and the right front vibration part 50b vibrate (Step S411 of FIG. 15).

As illustrated in FIG. 19, the host vehicle 1 is traveling on the merging lane T1 of the freeway, and is about to merge into the main lane T2. In this case, the allowable range P for the driver D's sight is set as the second range P2 and the fourth range P4. When the driver D is looking at the second range P2 and the fourth range P4, the display part 60, the sound output part 40, and the vibration part 50 output no safety confirmation. However, when a distance between a wall W along a road and the host vehicle 1 is insufficient, the display part 60 displays an image "no road ahead, and please pay attention to the surrounding", the sound output part 40 makes a sound "no road ahead, and please pay attention to the surrounding", and the left front vibration part 50a and the right front vibration part 50b vibrate (Step S411 of FIG. 15).

As illustrated in FIG. 20, the host vehicle 1 is traveling on the merging lane T1 of the freeway, and is about to merge into the main lane T2. In this case, the allowable range P for the driver D's sight is set as the second range P2 and the fourth range P4. When the driver D is looking at the second range P2 and the fourth range P4, the display part 60, the sound output part 40, and the vibration part 50 output no safety confirmation. However, when a distance between the host vehicle 1 and a pylon M is insufficient, the display part 60 displays an image "please pay attention to the front obstacle", the sound output part 40 makes a sound "please pay attention to the front obstacle", and the left front vibration part 50a and the right front vibration part 50b vibrate (Step S411 of FIG. 15).

The on-vehicle information processing device 10 of the second embodiment includes the obstacle information acquisition part 136 that acquires the obstacle information on the obstacle. The determination part (obstacle determination part 137) determines whether or not the obstacle approaches the host vehicle 1 based on the obstacle information, and the output part (sound output part 40, vibration part 50, and display part 60) outputs the predetermined notification based on the determination of the determination part (obstacle determination part 137) on the obstacle (FIG. 13).

The driver D is thereby notified to look ahead when the driver D is looking at the direction in which the safety confirmation is required in the location where the safety confirmation is required, and the host vehicle 1 may contact the front obstacle. Safer driving can be therefore supported.

The on-vehicle information processing method of the second embodiment includes the obstacle information acquisition step (Step S410 of FIG. 13) of acquiring the obstacle information on the obstacle. The determination step (Step S411 of FIG. 13) determines whether or not the obstacle approaches the host vehicle 1 based on the obstacle information, and the output step (Step S412 of FIG. 13) outputs the predetermined notification based on the determination of the determination step on the obstacle (Step S411 of FIG. 13).

The driver D is thereby notified to look ahead when the driver D is looking at the direction in which the safety confirmation is required in the location where the safety confirmation is required, and the host vehicle 1 may contact the obstacle in front of the host vehicle 1 in the traveling direction. Safer driving can be therefore supported. In addition, the other configurations and effects of the second embodiment are substantially similar to those in the first embodiment; and thus, the description thereof will be omitted.

As described above, the on-vehicle information processing device and the on-vehicle information processing method of the present disclosure are described based on the first embodiment and the second embodiment. However, the specific configuration and the operation are not limited to the embodiments, any combination of the embodiments, changes in design and additions are allowed as long as they do not depart from the gist of the invention according to each claim.

Figure 21:
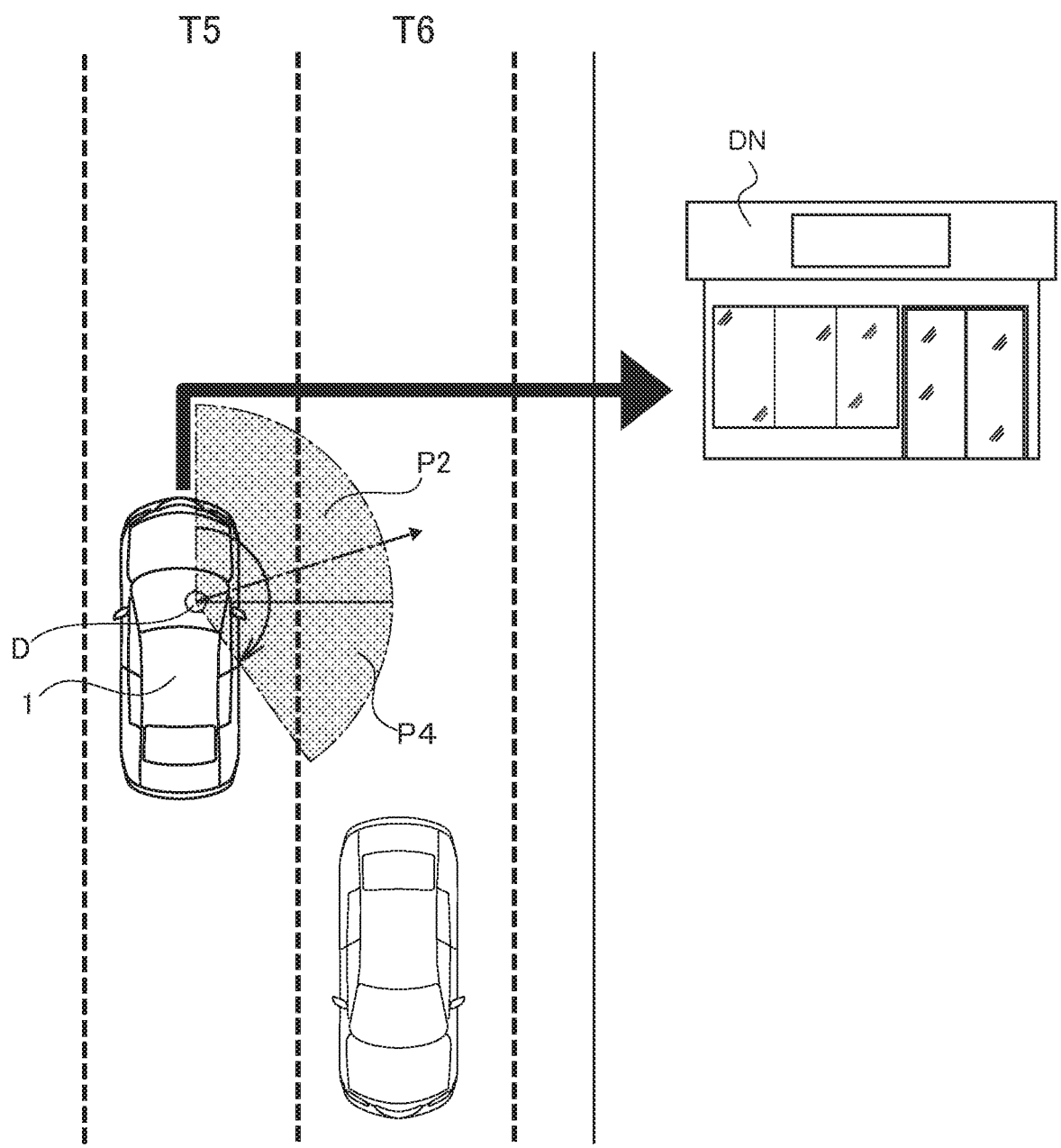
FIG. 21 is a drawing describing a location where safety conformation is required in another embodiment.

In the first embodiment and the second embodiment, the location where the safety confirmation is required includes the merging point on the freeway, the intersection without the traffic light, and the intersection with the traffic light. However, the location where the safety confirmation is required is not limited thereto. As illustrated in FIG. 21, for example the location where the safety confirmation is required may include a location where the host vehicle 1 turns right toward a destination DN across an opposing lane T6 of a traveling lane T5 on a road having one lane on one side. The location where the safety confirmation is required may include a location where the host vehicle 1 requires the lane change. The location where the safety confirmation is required may include a location where temporary stop is required in front of a crossing.

The first embodiment and the second embodiment show the examples in which the inattentive driving determination process A uses the information on the blinker to set the allowable range P for the driver D's sight, and the inattentive driving determination process B uses the positional information on the host vehicle 1 to set the allowable range P for the driver D's sight, and the inattentive driving determination process C uses the another vehicle information to set the allowable range P for the driver D's sight. However, the inattentive driving determination processes A to C can use any of the information on the blinker, the positional information on the host vehicle 1, and the another vehicle information.

The first embodiment and the second embodiment show the examples using the sound output part 40, the vibration part 50, and the display part 60 as the output parts. However, the output parts are not limited thereto, and a virtual image may be displayed using a head-up display device, for example.

The first embodiment and the second embodiment show the examples using the host vehicle 1 equipped with the on-vehicle information processing devices 10, 110 as a right-hand drive vehicle. However, the host vehicle equipped with the on-vehicle information processing device may be a left-hand drive vehicle.

The first embodiment and the second embodiment show the examples having four ranges, the first range P1, the second range P2, the third range P3, and the fourth range P4 as the allowable ranges P for the driver D's sight. However, two allowable ranges or five or more allowable ranges may be used.

The second embodiment shows the example in which the obstacle determination part 137 determines the distance between the host vehicle 1 and the obstacle in front of the host vehicle in the traveling direction. However, the obstacle determination part may determine the allowable range for the driver D's sight of the host vehicle 1 based on the obstacle information acquired by the obstacle information acquisition part 136. In this case, the allowable range for the driver D's sight which is determined by the obstacle determination part 137 represents a direction in a certain range for the driver D's to be looked at for avoiding contact and collision to the obstacle. The allowable range for the driver D's sight which is determined by the obstacle determination part 137 is similar to the allowable range for the driver D's sight which is set by the setting part 34, and includes the first range P1, the second range P2, the third range P3, and the fourth range P4.

The second embodiment shows the example in which the obstacle determination process is used for the inattentive driving determination process A of the first embodiment. However, the obstacle determination process may be used for the inattentive driving determination process B or the inattentive driving determination process C of the first embodiment.

The second embodiment shows the example in which the obstacle determination process is executed based on the obstacle determination process. However, the obstacle determination process may notify regardless of the allowable range set by the setting part 34 when the host vehicle 1 travels too fast.

The first and second embodiments show the examples in which the information processing device and the information processing method of the present disclosure are applied to a road having two lanes on one side. However, the information processing device and the information processing method of the present disclosure may be applied to a road having three lanes on one side.

The invention claimed is:
1. An information processing device comprising:
a controller,
wherein the controller comprises:
a host vehicle information acquisition part configured to acquire host vehicle information on a host vehicle;
a setting part configured to set an allowable range for a sight of a driver of the host vehicle based on the host vehicle information;
a driver information acquisition part configured to acquire driver information on the driver; and
a determination part configured to determine whether or not the driver is looking at the allowable range based on the allowable range and the driver information,
wherein the information processing device is configured to output a predetermined notification based on the determination of the determination part,
wherein the allowable range includes a first range, a second range, a third range, and a fourth range, the first range being a left front range of the driver, the second range being a right front range of the driver, the third range being a left rear range of the driver, and the fourth range being a right rear range of the driver, and
wherein the setting part is configured to set the allowable range to the first range and the second range when the setting part determines that the host vehicle is at an intersection without a traffic light.

2. The information processing device according to claim 1,
wherein the host vehicle information includes information on an operation of a blinker of the host vehicle, and
wherein the setting part is configured to set the allowable range for the sight of the driver based on the information on the operation of the blinker of the host vehicle.

3. The information processing device according to claim 1, wherein the controller further comprises:
an another vehicle information acquisition part configured to acquire another vehicle information on another vehicle,
wherein the setting part is configured to:
set the allowable range based on the another vehicle information;
set the allowable range to the second range and the fourth range when the another vehicle that the host vehicle may contact travels in a right direction of the host vehicle; and
set the allowable range to the first range and the third range when the another vehicle that the host vehicle may contact travels in a left direction of the host vehicle.

4. The information processing device according to claim 1,
wherein the setting part is configured to set the allowable range to: (i) the first range when the host vehicle is at an intersection with a traffic light and a left blinker of the host vehicle is turned on; and (ii) the second range when the host vehicle is at the intersection with the traffic light and a right blinker of the host vehicle is turned on.

5. The information processing device according to claim 1, wherein the controller further comprises:
an obstacle information acquisition part configured to acquire obstacle information on an obstacle,
wherein the determination part is configured to determine whether or not the obstacle approaches the host vehicle based on the obstacle information, and
wherein the information processing device is configured to output the predetermined notification based on the determination of the determination part on the obstacle.

6. The information processing device according to claim 1, wherein the predetermined notification includes sound.

7. The information processing device according to claim 1, wherein the predetermined notification includes vibration of a seat of the host vehicle.

8. The information processing device according to claim 1, wherein the predetermined notification includes a display of visual information.

9. An information processing method comprising:
acquiring host vehicle information on a host vehicle;
setting an allowable range for a sight of a driver of the host vehicle based on the host vehicle information;
acquiring driver information on the driver;
determining whether or not the driver is looking at the allowable range based on the allowable range and the driver information; and
outputting a predetermined notification based on the determination of whether or not the driver is looking at the allowable range,
wherein the allowable range includes a first range, a second range, a third range, and a fourth range, the first range being a left front range of the driver, the second range being a right front range of the driver, the third range being a left rear range of the driver, and the fourth range being a right rear range of the driver, and
wherein the setting of the allowable range includes setting the allowable range to the first range and the second range when the host vehicle is at an intersection without a traffic light.

10. The information processing method according to claim 9, further comprising:
acquiring another vehicle information on another vehicle,
wherein the setting of the allowable range includes setting the allowable range based on the another vehicle information.

11. The information processing method according to claim 9, further comprising:
acquiring obstacle information on an obstacle,
wherein the determination of whether or not the driver is looking at the allowable range includes determining whether or not the obstacle approaches the host vehicle based on the obstacle information, and
wherein the outputting of the predetermined notification includes outputting the predetermined notification based on the determination of whether or not the obstacle approaches the host vehicle based on the obstacle information.

12. The information processing method according to claim 9, wherein the predetermined notification includes sound.

13. The information processing method according to claim 9, wherein the predetermined notification includes vibration of a seat of the host vehicle.

14. The information processing method according to claim 9, wherein the predetermined notification includes a display of visual information.

* * * * *